(12) United States Patent
Xu et al.

(10) Patent No.: US 11,792,535 B2
(45) Date of Patent: Oct. 17, 2023

(54) SYSTEM AND METHOD TO IMPROVE QUALITY IN UNDER-DISPLAY CAMERA SYSTEM WITH RADIALLY INCREASING DISTORTION

(71) Applicant: Samsung Electronics Co., Ltd., Suwon-si (KR)

(72) Inventors: Yibo Xu, Plano, TX (US); Hamid R Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/586,490

(22) Filed: Jan. 27, 2022

(65) Prior Publication Data

US 2023/0053084 A1    Feb. 16, 2023

Related U.S. Application Data

(60) Provisional application No. 63/231,594, filed on Aug. 10, 2021.

(51) Int. Cl.
*H04N 23/80* (2023.01)
*H04N 23/76* (2023.01)
*H04N 23/84* (2023.01)
*G06F 1/16* (2006.01)

(52) U.S. Cl.
CPC ............. *H04N 23/80* (2023.01); *H04N 23/76* (2023.01); *H04N 23/84* (2023.01); *G06F 1/1686* (2013.01)

(58) Field of Classification Search
CPC ........ H04N 23/80; H04N 23/76; H04N 23/84; G06F 1/1686
See application file for complete search history.

(56) References Cited

U.S. PATENT DOCUMENTS

| | | |
|---|---|---|
| 7,991,240 B2 | 8/2011 | Bakin et al. |
| 8,274,583 B2 | 9/2012 | Zimmer et al. |
| 8,471,932 B2 | 6/2013 | Cote et al. |
| 8,509,504 B2 | 8/2013 | Casey et al. |
| 9,743,057 B2 | 8/2017 | Cote et al. |

(Continued)

OTHER PUBLICATIONS

International Search Report and Written Opinion of the International Searching Authority dated Sep. 8, 2022 in connection with International Application No. PCT/KR2022/007739, 8 pages.

*Primary Examiner* — Christopher K Peterson

(57) ABSTRACT

A system and method are provided to improve quality in an under-display camera (UDC) system with radially-increasing distortion. At least one processor receives an image and performs multi-frame processing, image signal processing, and a point spread function inversion (PSFI) on the image to produce a processed image. A PSFI radial coring is applied on the processed image to reduce noise in the processed image resulting from the PSFI. The at least one processor can apply a chroma suppression to the processing of the image to reduce brightness and color saturation is select areas in the processed image. Image restoration can be performed on the processed image to produce an output image. The image restoration may include generating a dither signal, applying a dither signal corner attenuation to the dither signal, combining the attenuated dither signal with a sharpened denoised signal, and applying a halo suppression on the combined signals.

20 Claims, 21 Drawing Sheets

(56) References Cited

U.S. PATENT DOCUMENTS

| | | |
|---|---|---|
| 10,339,643 B2 | 7/2019 | Tezaur et al. |
| 2009/0076754 A1 | 3/2009 | Bakin et al. |
| 2010/0141807 A1 | 6/2010 | Alon et al. |
| 2010/0309345 A1 | 12/2010 | Zimmer et al. |
| 2015/0030258 A1 | 1/2015 | Chen et al. |
| 2018/0020157 A1 | 1/2018 | Gill |
| 2019/0113733 A1 | 4/2019 | Miyashiro et al. |
| 2020/0265567 A1* | 8/2020 | Hu .......................... G06T 5/007 |
| 2021/0029336 A1* | 1/2021 | Liu ........................ H04N 23/80 |
| 2021/0199952 A1* | 7/2021 | Cho ....................... G06T 5/003 |
| 2022/0091409 A1* | 3/2022 | Breckenridge .......... G02B 5/09 |

* cited by examiner

SYSTEM AND METHOD TO IMPROVE QUALITY IN UNDER-DISPLAY CAMERA SYSTEM WITH RADIALLY INCREASING DISTORTION

CROSS-REFERENCE TO RELATED APPLICATION AND PRIORITY CLAIM

This application claims priority under 35 U.S.C. § 119(e) to U.S. Provisional Patent Application No. 63/231,594 filed on Aug. 10, 2021, which is hereby incorporated by reference in its entirety.

TECHNICAL FIELD

This disclosure relates generally to imaging systems. More specifically, this disclosure relates to a system and method for improving quality in an under-display camera system with radially-increasing distortion.

BACKGROUND

Mobile electronic devices, such as smartphones and tablet computers, have become the most prevalent device type for capturing, uploading, and sharing digital images. However, in certain camera systems, noise and artifacts may be present in the resulting images.

SUMMARY

This disclosure relates to a system and method for improving quality in an under-display camera system with radially-increasing distortion.

In a first embodiment, an electronic device includes a display, an imaging system, and at least one processor. The at least one processor is configured to obtain an image captured by the imaging system, where the image includes one or more frames. The at least one processor is also configured to perform multi-frame processing and image signal processing on the image to produce a first processed image. The at least one processor is further configured to perform a point spread function inversion (PSFI) on the first processed image to produce a second processed image. In addition, the at least one processor is configured to apply PSFI radial coring on the second processed image, where the PSFI radial coring is configured to reduce noise in the second processed image resulting from the PSFI.

In a second embodiment, a method includes obtaining an image, where the image includes one or more frames. The method also includes performing multi-frame processing and image signal processing on the image to produce a first processed image. The method further includes performing a PSFI on the first processed image to produce a second processed image. In addition, the method includes applying a PSFI radial coring on the second processed image, where the PSFI radial coring is configured to reduce noise in the second processed image resulting from the PSFI.

In a third embodiment, an electronic device includes a display, an imaging system, and at least one processor. The at least one processor is configured to obtain an image captured by the imaging system, where the image includes one or more frames. The at least one processor is also configured perform multi-frame processing, image signal processing, and image processing on the image to produce a processed image. The at least one processor is further configured to apply a chroma suppression to the processed image, where the chroma suppression is configured to reduce brightness and color saturation is select areas in the processed image.

In a fourth embodiment, an electronic device includes a display, an imaging system, and at least one processor. The at least one processor is configured to obtain an image captured by the imaging system, where the image includes one or more frames. The at least one processor is also configured perform multi-frame processing and image signal processing on the image to produce a processed image. The at least one processor is further configured to perform image restoration on the processed image to produce an output image. To perform the image restoration, the at least one processor is configured to generate a dither signal, apply a dither signal corner attenuation to the dither signal, combine the attenuated dither signal with a sharpened denoised signal, and apply a halo suppression on the combined signals.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 24, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices, such as smartphones and tablet computers, have become the most prevalent device type for capturing, uploading, and sharing digital images. However, in certain camera systems, noise and artifacts may be present in the resulting images.

In some embodiments of this disclosure, a mobile device includes an under-display camera (UDC) system. Embodiments of the present disclosure provide a software/firmware and hardware co-designed feature. Certain embodiments provide users with full-screen experience and related benefits without much image quality (IQ) degradation. Due to a display being disposed in front of a camera lens, a point spread function (PSF) of the camera becomes a dispersed diffraction pattern, which adversely affects the camera capture, such as by causing noise, blurring, diffraction halos, and so forth. A UDC imaging pipeline aims to reduce these artifacts as much as possible. These artifacts are more severe in the corners of UDC images than in the centers, which is a consequence of the combination of reduced light levels in the corners and a more dispersed diffraction PSF in the corners compared to the centers. Previous UDC pipeline outputs suffer from enhanced noise, bluish noise, quantization contours, and so forth in the corners.

This disclosure provides techniques for image noise and artifact correction. In certain embodiments, the noise and artifact correction is performed using an artificial intelligence/machine learning (AI/ML) agent that supports image quality adjustment. In certain embodiments of the present disclosure, several algorithms are provided to reduce these artifacts and improve UDC corner image quality based on the characteristics of the image. Certain embodiments of the present disclosure provide a point spread function inversion (PSFI) radial coring algorithm to suppresses enhanced noise in the corners by PSFI. Certain embodiments of the present disclosure provide an algorithm that applies an attenuation gain on the PSFI correction signal more towards the corners. Certain embodiments of the present disclosure also provide a chroma suppression algorithm to reduce bluish noise at the corners. Certain embodiments of the present disclosure further provide a dither algorithm to reduce contour in the image corners and make the image look more realistic.

Figure 1:
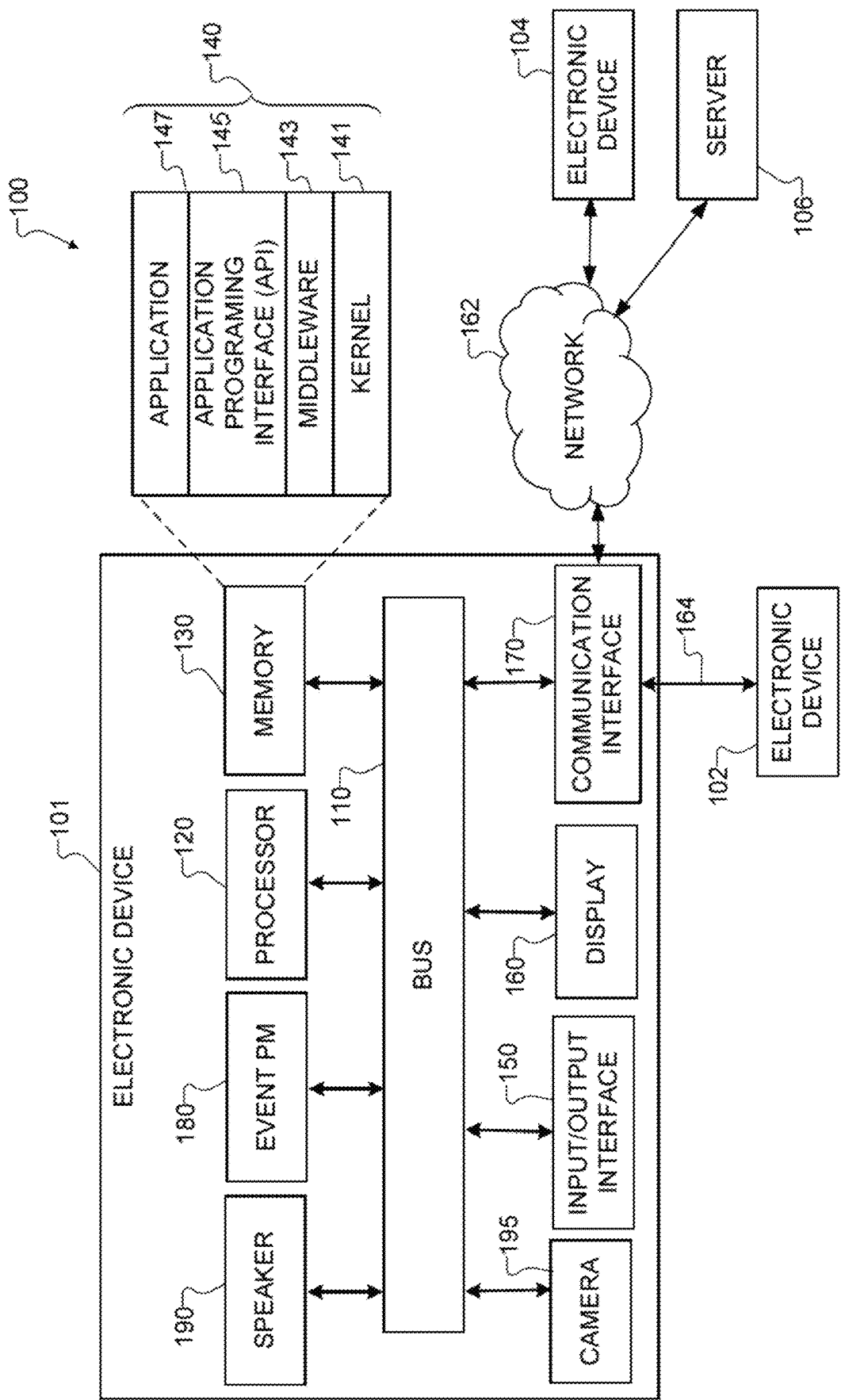
FIG. 1 illustrates an example network configuration including an electronic device in accordance with this disclosure.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
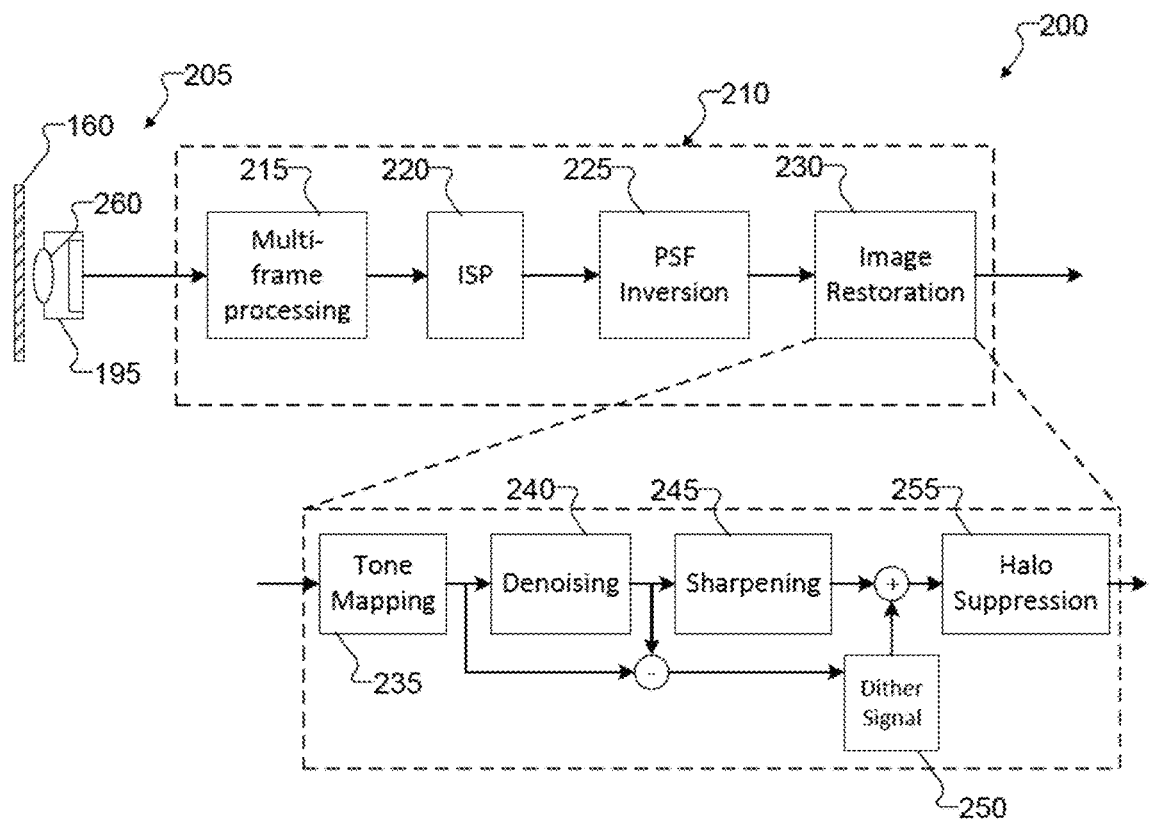
FIG. 2 illustrates an example imaging pipeline in accordance with this disclosure.

FIG. 2 illustrates an example imaging pipeline 200 in accordance with this disclosure. For ease of explanation, the imaging pipeline 200 may be described as being included in or used by the electronic device 101 in the network configuration 100 of FIG. 1. However, the imaging pipeline 200 may be included in or used by any other suitable device and in any other suitable system, such as a system that includes an imaging system or processes images captured by an imaging system.

In certain embodiments, the electronic device 101 includes a UDC 205, which includes at least one camera 195 disposed beneath a display 160. The UDC 205 is configured to capture one or more frames of an image. For example, the UDC 205 can capture one or more still or moving images. The UDC 205 delivers the captured image(s) to a processor 210, which includes the imaging pipeline 200. The processor 210 can be the same as the processor 120 or can be a different processor coupled directly or indirectly to the processor 120.

The imaging pipeline 200 includes blocks or modules for multi-frame processing (MFP) 215, image signal processing (ISP) 220, PSF inversion (PSFI) 225, and image restoration 230. The image restoration 230 includes blocks or modules for tone mapping 235, denoising 240, sharpening 245, generation of a dither signal 250, and halo suppression 255. One or more of the blocks or modules can be implemented in hardware, software, firmware, or a combination of hardware and software/firmware. For example, one or more of the blocks can be implemented in processing circuitry configured to perform the specified functions or configured to execute instructions in an algorithm to perform the specified functions.

The one or more images are processed through the MFP 215, the ISP 220, and the PSFI 225. In some cases, the UDC 205 may capture multiple raw Bayer frames. The MFP 215 applies a multi-frame processing algorithm, and the ISP 220 converts the image(s) from the raw Bayer format to a Red-Green-Blue (RGB) domain or a luma (Y)/blue chroma (U)/red chroma (V) (YUV) domain. For example, the ISP 220 can perform a de-mosaic operation and output an RGB or YUV image. Since the display 160 is in front of the UDC 205, a point spread function causes a diffractive pattern, which causes the image quality to degrade. Therefore, the PSFI 225 inverts the effects of the diffractive PSF to restore image quality.

The output of the PSFI 225 is provided to the image restoration 230, where the image is processed through tone mapping 235 to produce a tone-mapped signal. The tone mapping 235 compresses the brightness and dynamic range of the image from a higher bit depth to a lower bit depth in order to compress the image brightness. The tone-mapped signal is provided to denoising 240 in order to remove noise from the tone-mapped signal and produce a denoised signal. Thereafter, the denoised signal is removed from the tone-mapped signal to produce a dither signal 250. The denoised signal is also processed through sharpening 245 to produce a sharpened signal, which is added to the dither signal 250. Adding the dither signal 250 to the sharped signal reintroduces part of the noise that was removed by the denoising 240. Adding part of the noise reintroduces some lost details and assists in making the image more realistic. Thereafter, halo suppression 255 is applied to the resultant signal to produce a refined image. Halos are white or black lines along edges within the image, and the halo suppression 255 removes the halos from within the image.

In this way, the UDC imaging pipeline 200 takes in multiple frames captured by the UDC 205, performs MFP 215 to generate a blended output image, and performs PSFI 225 to invert the PSF from UDC diffraction to get back the sharp image. The ISP 220 performs various operations including the denoising 240, sharpening 245, halo suppression 255, and the like. In certain embodiments, the MFP 215 and the PSFI 225 are used in the UDC imaging pipeline 200 to achieve improved quality in the output image.

Embodiments of the present disclosure provide a software/firmware and hardware co-designed feature and provide users with a full-screen experience and related benefits without much image quality degradation. Due to the display 160 being in front of a camera lens 260, the PSF of the UDC 205 becomes a dispersed diffraction pattern that introduces adverse effects on image capture, such as noise, blurring, diffraction halos, and the like. The UDC imaging pipeline 200 aims to reduce these artifacts as much as possible. As noted above, these artifacts are more severe in the corners of the UDC images than in the centers of the UDC images, which is a consequence of a combination of reduced light levels in the corners and a more dispersed diffraction PSF in the corners compared to the centers. Previous UDC pipeline outputs suffer from enhanced noise, bluish noise, quantization contours, and so forth in the corners.

Embodiments of the present disclosure provide various algorithms to reduce these artifacts and improve UDC image corner quality based on the characteristics of the images. Embodiments of the present disclosure provide a PSFI radial coring algorithm to suppress the enhanced noise in the corners by PSFI, where the algorithm applies an attenuation gain on a PSFI correction signal more towards the corners. Also, embodiments of the present disclosure provide a chroma suppression algorithm to reduce the bluish noise at the corners. Additionally, embodiments of the present disclosure provide a dither algorithm to reduce contour in the image corners and make images look more realistic.

Figure 3:
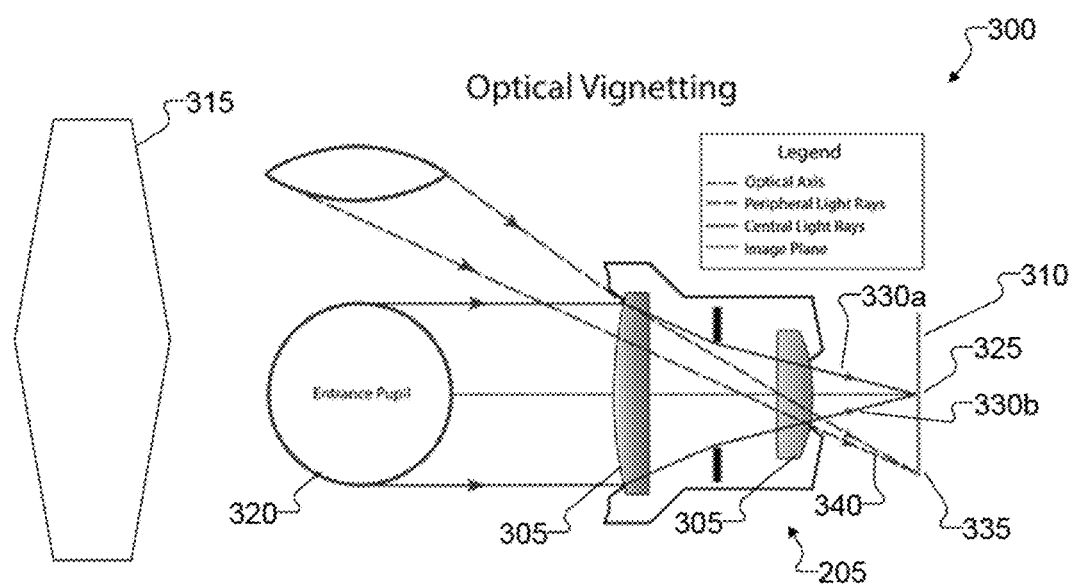
FIG. 3 illustrates an example of optical vignetting in accordance with this disclosure.

FIG. 3 illustrates an example of optical vignetting 300 in accordance with this disclosure. The embodiment of the optical vignetting 300 shown in FIG. 3 is for illustration only. Other embodiments could be used without departing from the scope of the present disclosure. Image degradation is more severe in the corners of UDC images than in their centers, mostly for two reasons: (1) reduced light intensity in the corners than the centers due to vignetting, which is a common issue for mobile device cameras, and (2) a more dispersed diffraction PSF pattern in the corners compared to the centers, which is a special issue for UDC.

The example of the optical vignetting 300 shown in FIG. 3 illustrates a cause of a radially-increasing artifact in a UDC 205. In certain UDC systems, more artifacts appear at the corners of an image. There may be two reasons for artifacts appearing in the corners of the images for a UDC system. A first reason is optical vignetting 300, which can be common for all cameras (including for UDC 205). A second reason is a result of a point spread function (PSF).

Optical vignetting 300 is common for any camera having lenses 305 and with an imaging sensor 310 or imaging plane. Optical vignetting 300 is related to an angle of light that a pixel of a sensor 310 receives. As the camera is capturing an image of an object 315, the light from the object 315 traverses through an entrance pupil 320. A center pixel 325 at a center of the sensor 310 receives all the light at an angle between light beams 330a and 330b. A second pixel 335 at a corner of the sensor 310 receives light at a much smaller angle 340 than that of the center pixel 325. Therefore, the second pixel 335 receives less light than the center pixel 325. Even though both pixels receive light from the same object 315 and the object 315 has a certain brightness, the second pixel 335 receives less light than the center pixel 325. Since the second pixel 335 at the corner receives less light, there is more noise that can be present at the second pixel 335, as well as a lower signal-to noise-ratio (SNR).

Figure 4:
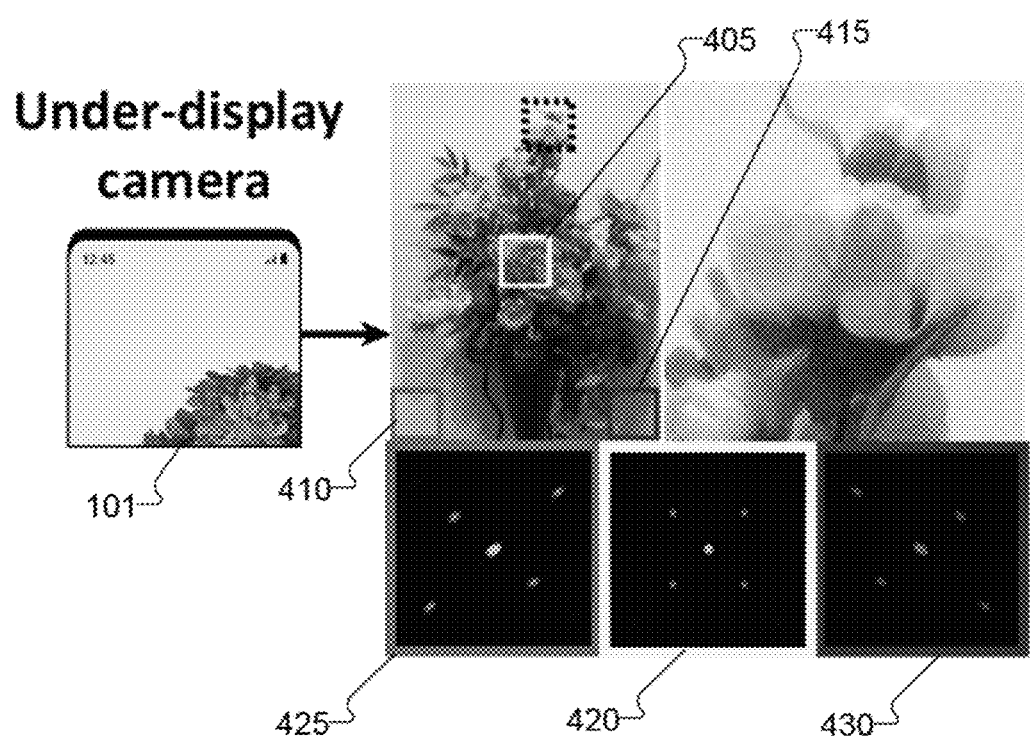
FIG. 4 illustrates an example of spatially-variant blur kernels in accordance with this disclosure.

FIG. 4 illustrates an example of spatially-variant blur kernels in accordance with this disclosure. The example of the spatially-variant blur kernels shown in FIG. 4 is for illustration only. Other examples could be used without departing from the scope of the present disclosure. In certain embodiments, the PSF may cause spatially-variant blur kernels. The PSF is different between a center pixel 405 and a second pixel 410 or 415 at the corner(s). For example, a first image 420 illustrates a point spread for the center pixel 405, and a second image 425 illustrates a point spread for a second pixel 410, and a third image 430 illustrates a point spread for a third pixel 415. The PSF creates a first pattern of blur kernels in the first image 420, a second pattern of blur kernels in the second image 425, and a third pattern of blur kernels in the third image 430.

As a result, when using a regular camera without a display 160 disposed in front of the camera 195, the point spread function pattern in the first image 420 is a concentrated dot. That is, the pattern in the first image 420 from the PSF is a single dot, which can form a dimension with good quality. In contrast, when using a UDC 205 with a display 160 in front of the camera 195, the pattern from the PSF will be multiple dots in a diffractive pattern as shown in the example of the first image 420 depicted in FIG. 4. The multiple dots in the first image 420 form a pattern that blurs the captured image. With the UDC 205, there can be multiple dots and more complex patterns that blur the image based on the PSF. In the second image 425 and the third image 430 (which are for the pixels 410 and 415 in the corners), the PSFs for such pixels 410 and 415 are more dispersed since the exterior points are much further apart from the center. Therefore, the diffraction at the corner pixels 410 and 415 is more severe. For the pixels at the corners in the UDC 205, more artifacts are introduced, causing lower lighting density and more noise.

The aforementioned noise and lower light density are artifacts produced in the image. As noted above, pixels and associated image quality in the corners tend to be more severely impacted than in the center for a UDC image. Embodiments of the present disclosure provide a system and method to correct for the radially-increasing artifacts in a UDC system.

Figure 5:
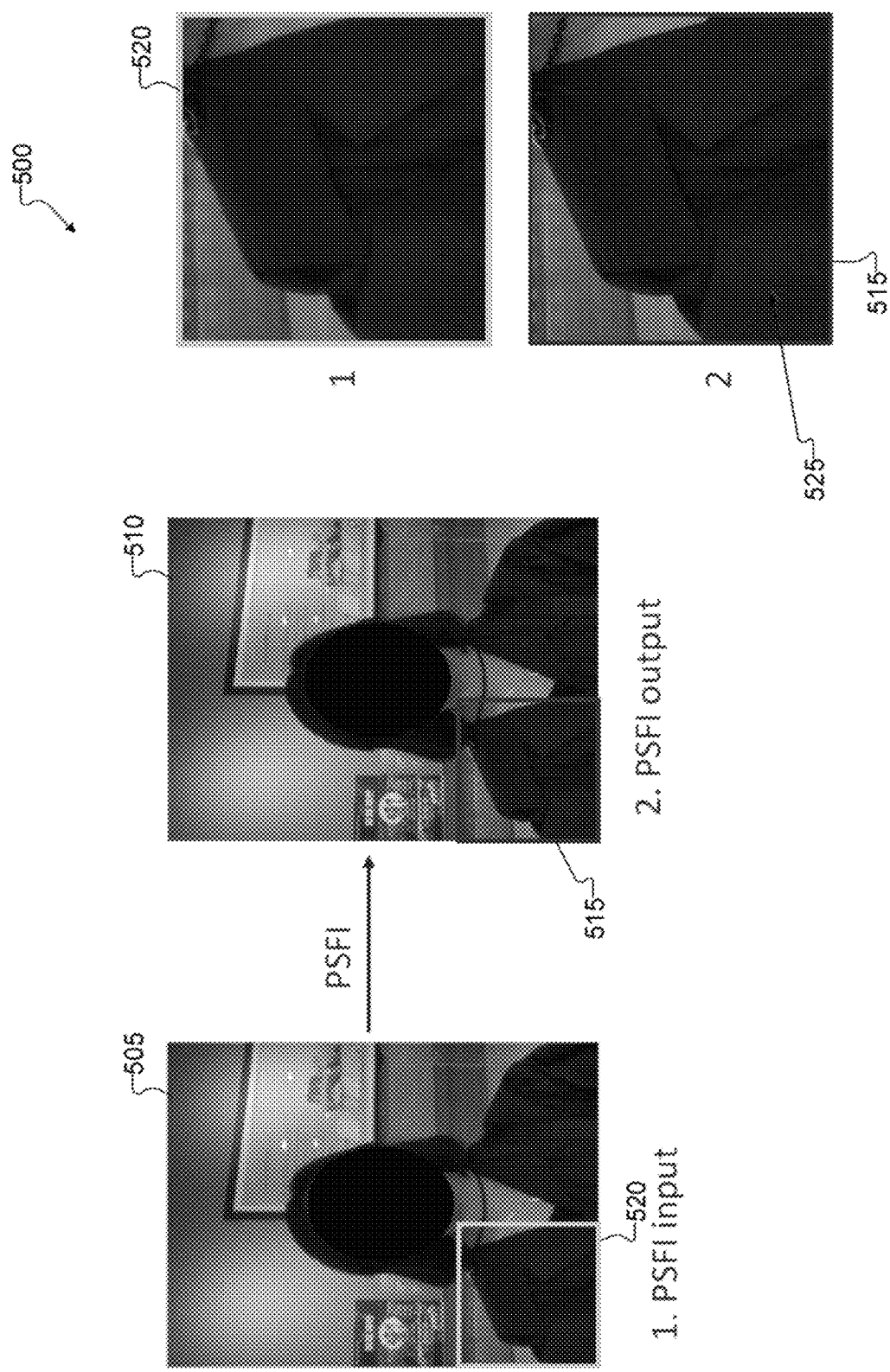
FIG. 5 illustrates an example of point spread function inversion (PSFI) noise in accordance with this disclosure.

FIG. 5 illustrates an example of PSFI noise 500 in accordance with this disclosure. The example shown in FIG. 5 is for illustration only. Other examples could be used without departing from the scope of the present disclosure. An important corner issue affecting UDC images is noise enhancement by PSF inversion (PSFI). In the example shown in FIG. 5, a first image 505 is input to the PSFI 225. The PSFI 225 aims to invert the diffraction PSF to produce a sharp and clean image. In certain systems, a PSFI model sharpens an image but has the side effect of enhancing noise, as well. The noise enhancement effect is especially distinct in the corners because the corners are typically noisier. For example, the PSFI 225 outputs a second image 510 in which a corner 515 corresponding to a corner 520 of the first image 505 includes noise 525 that has been enhanced by the PSFI 225. That is, as the PSFI 225 tries to invert the diffractive PSF to improve the image quality, the PSFI 225 applies a PSF algorithm that sharpens the image but also enhances the noise 525 within the image. The PSFI 225 can therefore be viewed as a sharpening tool that may sharpen the image quality but also enhance the noise 525 in the corner 515 of the image 510. For example, the corner 520 may already include more noise than a remaining portion of the image, and the sharpening process of the PSFI 225 enhances the noise in the corner 520 to produce enhanced noise 525 in the corner 515. As such, the effects of the PSFI 225 are more severe in the corner 515.

Figure 6A:
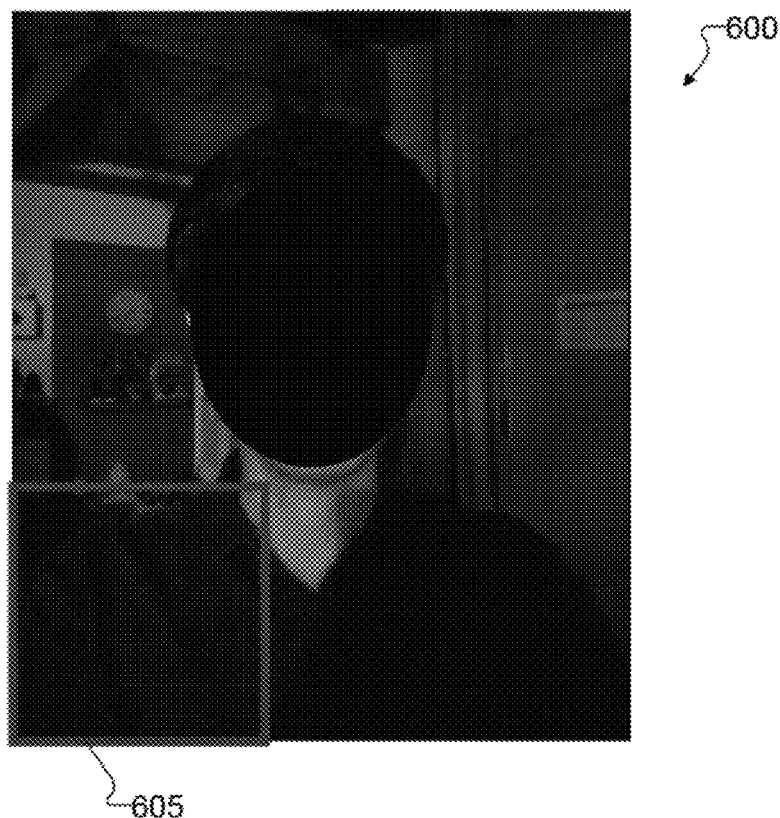
FIGS. 6A and 6B illustrate examples of corner bluing in accordance with this disclosure.
Figure 6B:
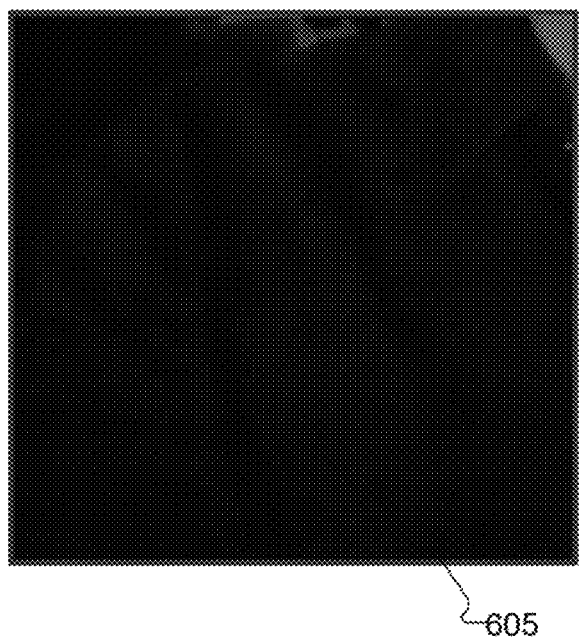

FIGS. 6A and 6B illustrate examples of corner bluing in accordance with this disclosure. The examples shown in FIGS. 6A and 6B are for illustration only. Other examples could be used without departing from the scope of the present disclosure. Another corner issue affecting UDC images is bluish noise in corners, especially in low-light conditions. In the example shown in FIGS. 6A and 6B, a first image 600 is received from the UDC 205. The image sensor for the UDC 205 includes three different color channels (namely a blue channel, a red channel, and a green channel), where pixels capturing different colors are interleaved. The blue channel of the sensor often has a lower sensitivity compared to the red and green channels. Therefore, the blue channel is typically the noisiest. When light level is low and when combined with factors such as vignetting and corner diffraction such as in UDC 205, the blue channel noise can dominate and lead to bluish noise in the corners 605.

Figure 7A:
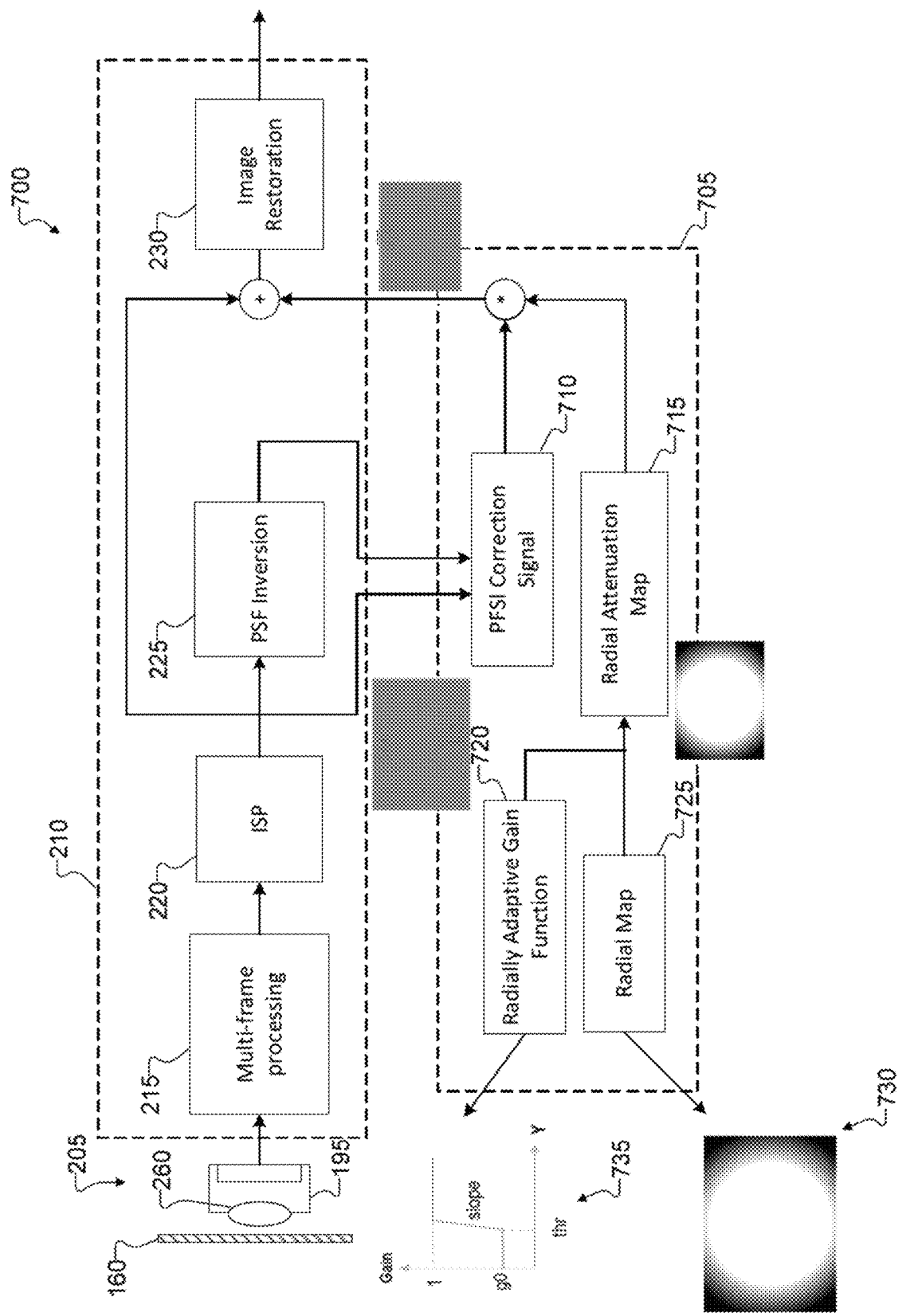
FIGS. 7A and 7B illustrate example imaging pipelines with PSFI radial coring in accordance with this disclosure.
Figure 7B:
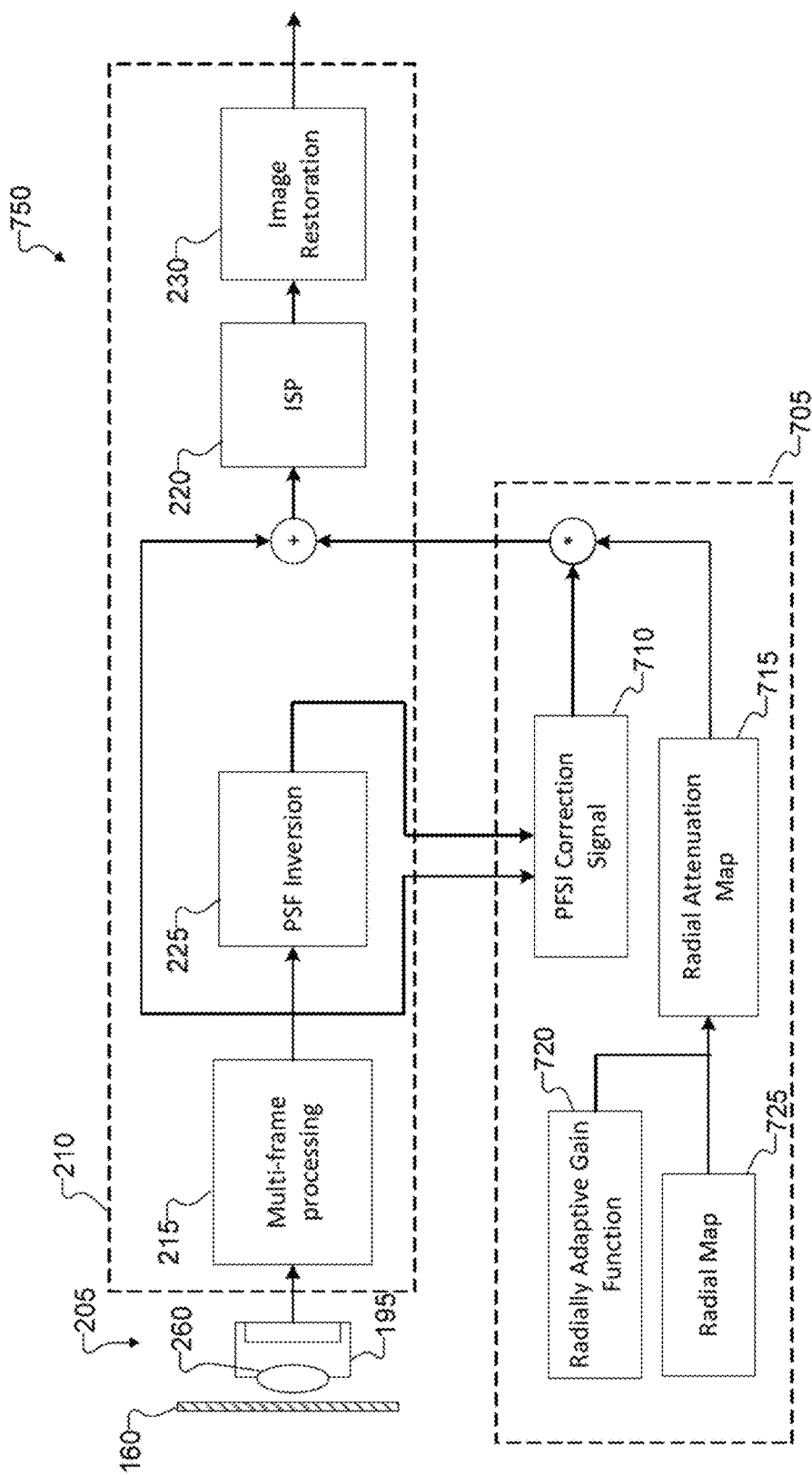

FIGS. 7A and 7B illustrate example imaging pipelines 700 and 750 with PSFI radial coring in accordance with this disclosure. The embodiments of the imaging pipelines 700 and 750 are for illustration only. Other embodiments could be used without departing from the present disclosure. As described above, the UDC 205 delivers captured images to the processor 210, which includes the imaging pipeline 200. Similar to the imaging pipeline 200, the imaging pipeline 700 includes blocks or modules for MFP 215, ISP 220, PSFI 225, and image restoration 230. The imaging pipeline 700 further includes a PSFI radial coring pipeline 705. The PSFI radial coring pipeline 705 includes blocks or modules for PSFI correction 710 and application of a radial attenuation map 715, which is generated from a radially-adaptive gain function 720 and a radial map 725. One or more of the blocks or modules can be implemented in hardware, software, firmware, or a combination of hardware and software/firmware. For example, one or more of the blocks can be implemented in processing circuitry configured to perform the specified functions or configured to execute instructions in an algorithm to perform the specified functions.

The PSFI radial coring pipeline 705 is configured to reduce noise enhanced by PSFI in the image corners based on image characteristics. The PSFI radial coring pipeline 705 uses the radial map 725 and the radially-adaptive gain function 720 to generate the radial attenuation map 715, which determines the attenuation strength for each pixel in the image. The radial attenuation map 715 attenuates more towards the image corners. The PSFI 225 enhances image sharpness as well as noise. The PSFI correction 710 extracts signals before and after the PSFI 225 to create a PSFI correction signal. The PSFI correction signal corresponds to the differences introduced by the PSFI 225. The radial attenuation map 715 can be element-wise multiplied with the PSFI correction signal (from PSFI correction 710) so that corner areas in the image are attenuated more strongly than its center, thereby suppressing corner noise enhancement. That is, noise may occur throughout an image, and the PSFI 225 enhances noise more severely. For example, in portions of the image where noise is high initially, which is typically at the corners, the PSFI 225 enhances the noise in the corners. The PSFI radial coring pipeline 705 attenuates the PSF inversion correction signal radially to attenuate more towards the corners. Using the radial attenuation map 715, the PSFI correction signal is attenuated more towards the corners, and the attenuated PSFI correction signal is added back to the output of the ISP 220 and provided to the image restoration 230 to process an output the final image.

To attenuate the PSFI correction signal more at the corners, the PSFI radial coring pipeline 705 uses the radially-adaptive gain function 720 and the radial map 725. The radial map 725 is a map 730 having values that change strengths radially. The map 730 can have a design that is data dependent, predefined, image dependent, not image dependent, or defined in any other suitable manner. The gain function 720 can be a threshold-dependent gain, such as is illustrated in a gain chart 735, which may be included in the gain function 720. When input data is below a threshold, the gain value is set to g0. When the input data exceeds the threshold, the gain is set to one. That is, the gain value is smaller than one when the input data is below the threshold and one when the input data above below the threshold. Additionally, the threshold can be a soft threshold such that the gain value is sloped at or about the threshold. Each of g0, the threshold, and the slope are parameters that can be changed, tuned, or designed to vary the attenuation. The radial map 725 and the radially-adaptive gain function 720 are combined to generate the radial attenuation map 715. The radial attenuation map 715 can be element-wise multiplied with the PSFI correction signal (from PSFI correction 710) so that corner areas are attenuated more strongly than the center, suppressing corner noise enhancement.

In the example shown in FIG. 7A, the PSFI radial coring pipeline 705 is configured to receive an output of the ISP 220 and an output of the PSFI 225 as inputs. The output of the ISP 220 is further provided to the PSFI 225, added to an output of the PSFI radial coring pipeline 705, and provided to the imaging restoration 230. In the example shown in FIG. 7B, the ISP 220 occurs after the PSFI 225. Here, the PSFI radial coring pipeline 705 is configured to receive an output of the MFP 215 and an output of the PSFI 225 as inputs. The output of the MFP 215 is further provided to the PSFI 225, added to an output of the PSFI radial coring pipeline 705, and provided to the ISP 220. The output of the ISP 220 is provided to the image restoration 230.

Figure 8:
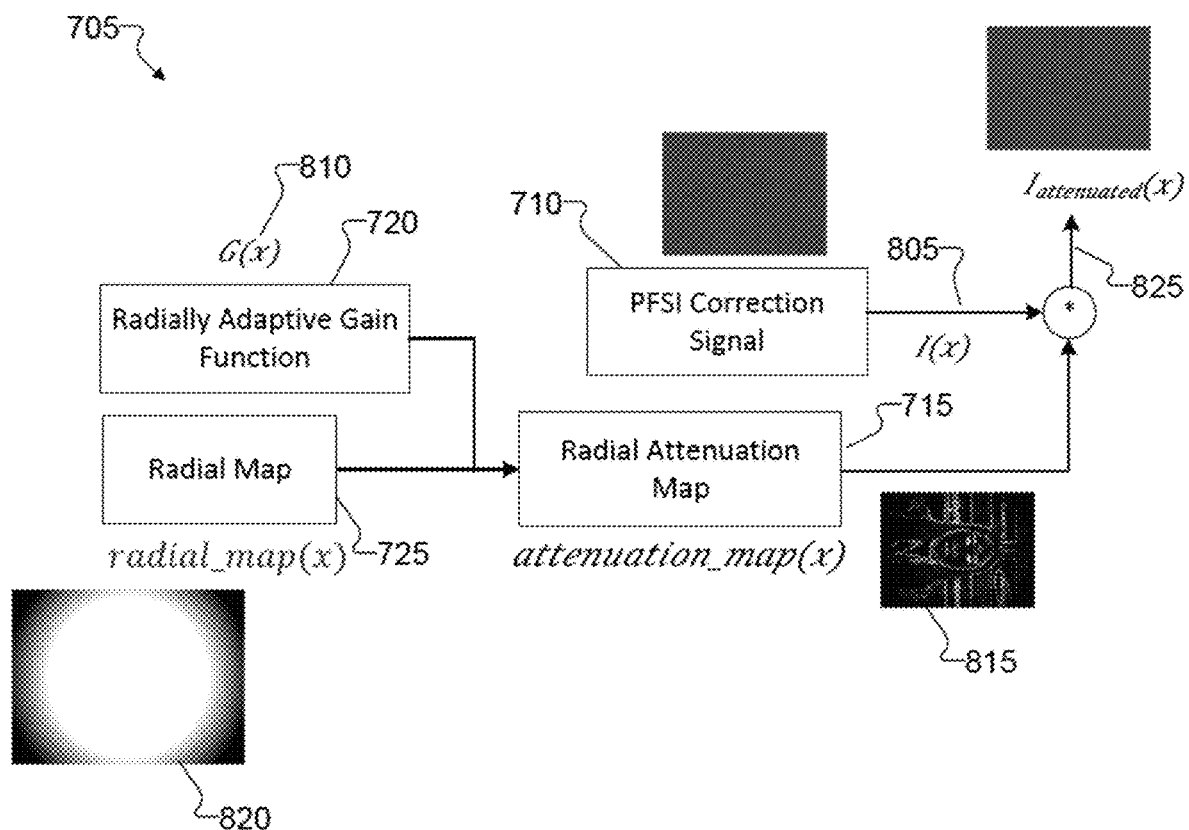
FIG. 8 illustrates an example PSFI radial coring pipeline in accordance with this disclosure.

FIG. 8 illustrates an example PSFI radial coring pipeline 705 in accordance with this disclosure. The example depicted in FIG. 8 is for illustration only. Other examples could be used without departing from the scope of the present disclosure. In this example, the PSFI correction 710 creates a PSFI correction signal I(x) 805, where x indicates pixel location and I(x) is the intensity at location x. A gain function G(x) 810 (where x is the pixel value) applies a gain on pixel values to attenuate pixels. In some embodiments, $G(x) \in [0,1]$. G(x) 810 can have any suitable form for a gain function. In particular embodiments, G(x) 810 is a piece-wise linear curve defined as follows:

$$G(x) = \begin{cases} g0, & \text{if } x \le thr \, (g0 < 1) \\ g0 + (x - thr) * \text{slope}, & \text{if } thr < x < thr + (1 - g0)/\text{slope} \\ 1, & \text{if } x \ge thr + (1 - g0)/\text{slope} \end{cases} \quad (1)$$

Here, G(x) 810 includes parameters thr, g0, and slope. G(x) 810 is configured to perform a soft threshold operation at a threshold value thr.

The radial attenuation map 715 includes attenuation_map(x) 815. In some cases, attenuation_map(x)=S((G(I(x))), where function S is an image smoothing function of any form used to smooth the radial attenuation map 715. The function attenuation_map(x) 815 represents the gain to be applied to I(x) 805 in order to attenuate pixel values of I(x). The radial map radial_map(x) 820 can be any function where the value is dependent on the radius of the pixel x, where the radius of x is defined as the distance from x to the center of the image. That is, the radial map's function depends on the radius, not the actual pixel location.

In some embodiments, an attenuated PSFI correction signal 825 can be defined as follows:

$$I_{attenuated} = \text{attenuation\_map}(x) * I(x), \quad (2)$$

In Equation (2), '*' indicates element-wise multiplication. Both the attenuation map and the PSFI correction signal can be matrices that are point-wise or element-wise multiplied. For example, I(x) 805 can be a rectangular matrix, and the attenuation_map(x) 815 can be a matrix of the same size. The element-wise multiplication between the two matrices implies multiplication of one element in the first matrix with an element in the same location in the second matrix. To attenuate I(x) 805 more towards the corners, the thr in G(x) 810 can be set to be radially adaptive, such as in the following manner:

$$thr = \text{radial\_map}(x), \quad (3)$$

In Equation (3), the radial map 725 has larger value towards the corners, so thr for the corner is higher than the center, imposing stronger coring operation in the corners. The adaptive thresholding and attenuation are referred to as coring operation or PSFI coring. To attenuate I(x) 805 more towards the corners, g0 in G(x) 810 can also be radially adaptive, meaning g0=radial_map(x). This means the radial map 725 can have smaller values towards the corners, so g0 for the corners is smaller than the center, imposing smaller gain and stronger coring operation in the corners.

In certain embodiments, the PSFI radial coring pipeline 705 is configured to correct the noise that occurs in corners of an image as a result of the enhancement by the PSFI. The PSFI radial coring pipeline 705 is capable of being applied in various domains, such as the YUV domain or the RGB domain. The PSFI radial coring pipeline 705 is also capable of operating on images produced by an imaging system having a single camera or multiple cameras, such as an imaging system with an RGB camera and a monochrome camera.

Figure 9A:
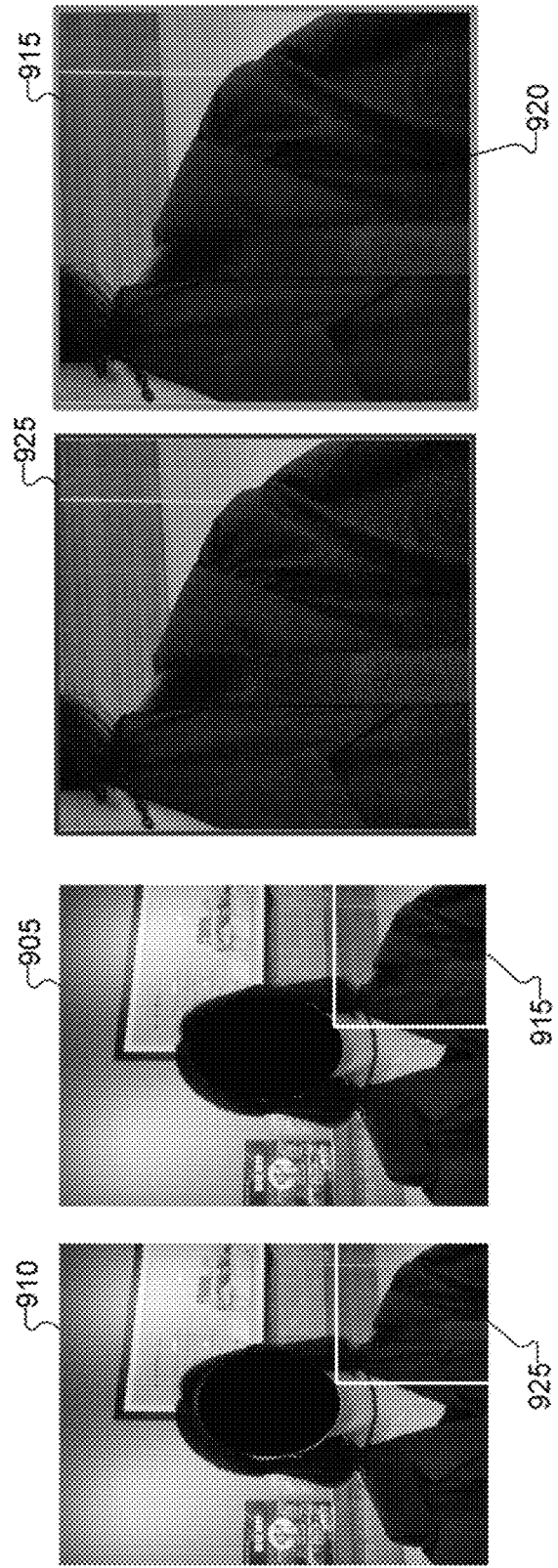
FIGS. 9A and 9B illustrate example results from a PSFI radial coring process in accordance with this disclosure.
Figure 9B:
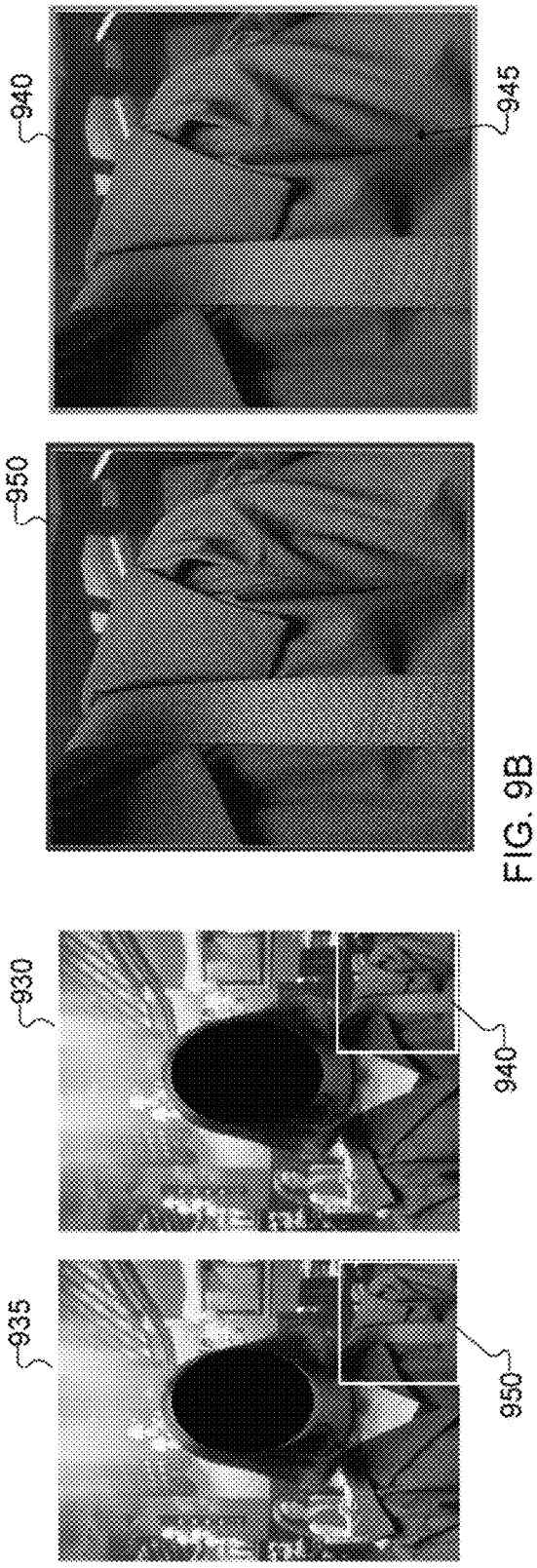
Figure 10:
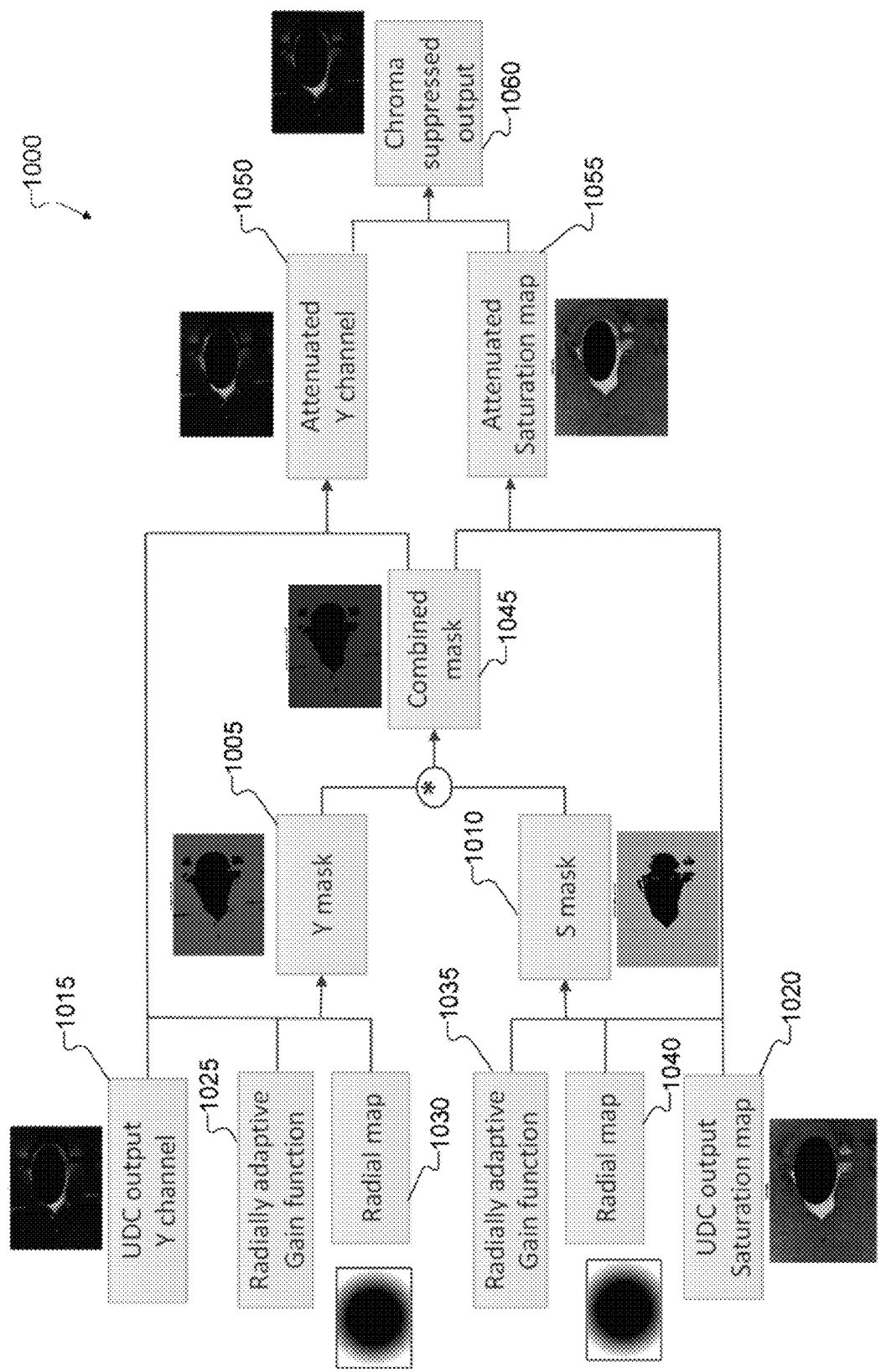
FIGS. 10 through 15 illustrate an example chroma suppression pipeline in accordance with this disclosure.

FIGS. 9A and 9B illustrate example results from a PSFI radial coring process in accordance with this disclosure. The examples shown in FIGS. 9A and 9B are for illustration only. Other examples could be used without departing from the scope of the present disclosure. In the example shown in FIG. 9A, an image is captured, and PSFI coring is applied to the image to produce a first image 905. A second image 910 is produced without PSFI coring being applied. A corner 915 from the first image 905 includes less noise 920 than a corner 925 from the second image 910. In the example shown in FIG. 9B, another image is captured, and PSFI coring is applied to the other image to produce a third image 930. A fourth image 935 is produced without PSFI coring being applied. A corner 940 from the third image 930 includes less noise 945 than a corner 950 from the fourth image 935.

FIGS. 10 through 15 illustrate an example chroma suppression pipeline 1000 in accordance with this disclosure. The embodiments of the chroma suppression pipeline 1000 shown in FIGS. 10 through 15 are for illustration only. Other embodiments could be used without departing from the scope of the present disclosure. In certain embodiments, the chroma suppression pipeline 1000 performs a chroma suppression algorithm to reduce the bluish noise artifacts in UDC output images' corners based on image characteristics. That is, the chroma suppression pipeline 1000 is configured to receive an image output from the image restoration 230 and apply the chroma suppression algorithm to the image. For the UDC 205, the bluish noise is typically seen in low-light conditions, dark areas, or a combination thereof. The chroma suppression pipeline 1000 generates a radially-adaptive image Y channel mask (Y mask) 1005 that selects the dark areas in the corners and generates a saturation (S) mask 1010 that selects the blue areas in the corners. The chroma suppression pipeline 1000 reduces both the Y values and saturation values for pixels that are selected by both the Y and saturation masks. Based on image characteristics, the chroma suppression pipeline 1000 reduces the brightness and color saturation in dark and blue areas in the corners of images.

The chroma suppression pipeline 1000 obtains, from an image, an output Y channel 1015 and an output saturation map 1020. The Y channel 1015 is the intensity or luminance channel of the image. The output Y channel 1015 is combined with a radially-adaptive gain function 1025 and a radial map 1030 to form the Y channel mask 1005. The output saturation map 1020 is combined with a radially-adaptive gain function 1035 and a radial map 1040 to form the S mask 1010. The Y mask 1005 and S mask 1010 are combined to form a combined mask 1045. The combined mask 1045 is combined with the output Y channel 1015 to create an attenuated Y channel 1050 and combined with the output saturation map 1020 to create an attenuated S map 1055. The attenuated Y channel 1050 is combined with the attenuated S map 1055 to form a chroma suppressed output image 1060.

Figure 11:
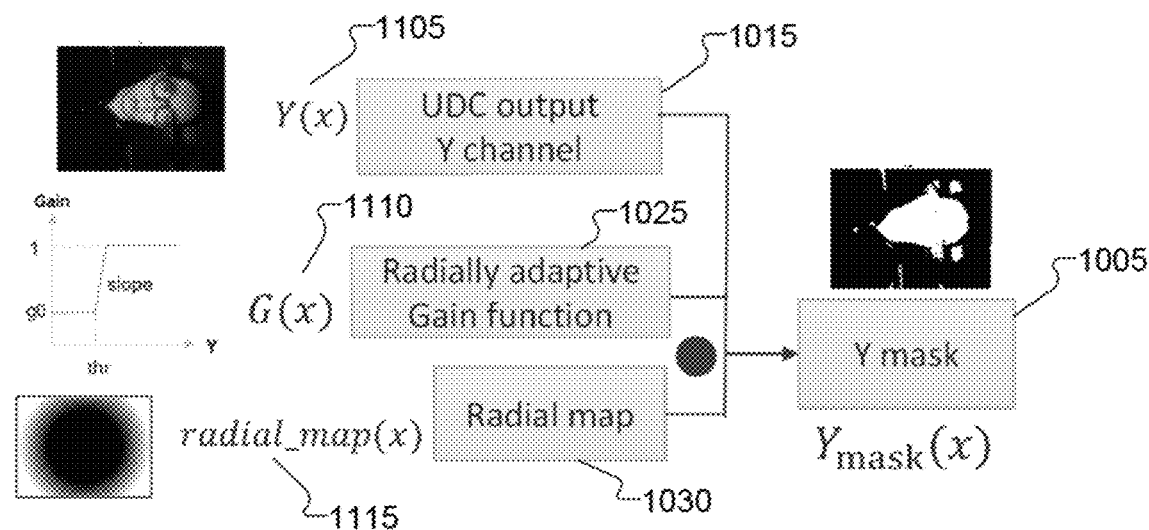

In FIG. 11, the output Y channel 1015 is denoted as Y(x) 1105, where x indicates pixel location. In certain embodiments, a gain function G (x) 1110 can have the same definition as G (x) 810 in the PSFI radial coring pipeline 705 of FIG. 8. Generally, G (x) 1110 can be any suitable gain function. A radial map radial_map(x) 1115 can be any function where the value is dependent on the radius of the pixel x as defined earlier. For radial attenuation in the corners, thr in G(x) 1110 can be set to be radially-adaptive, such as when thr=radial_map(x), where thr has increasing values towards the corners. Alternatively, g0 in G(x) 1110 can be set to be radially-adaptive, such as when g0=radial_map(x), where g0 has decreasing values towards the corners. In some cases, the Y channel mask 1005 can be determined as follows:

$$Y_{mask}(x) = 1 - G(Y(x)) \quad (4)$$

Figure 12:
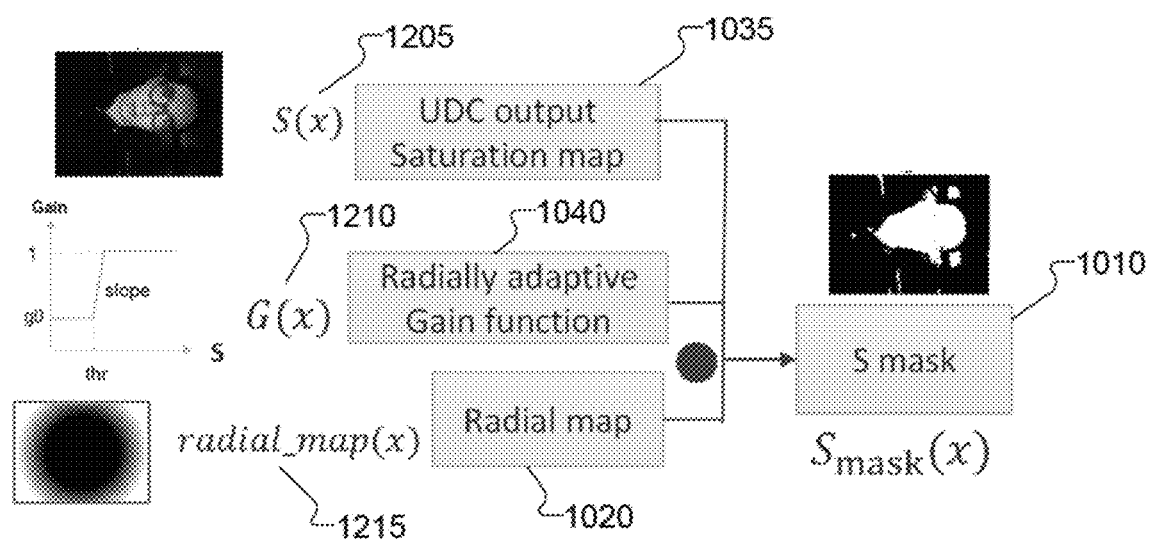
Figure 13:
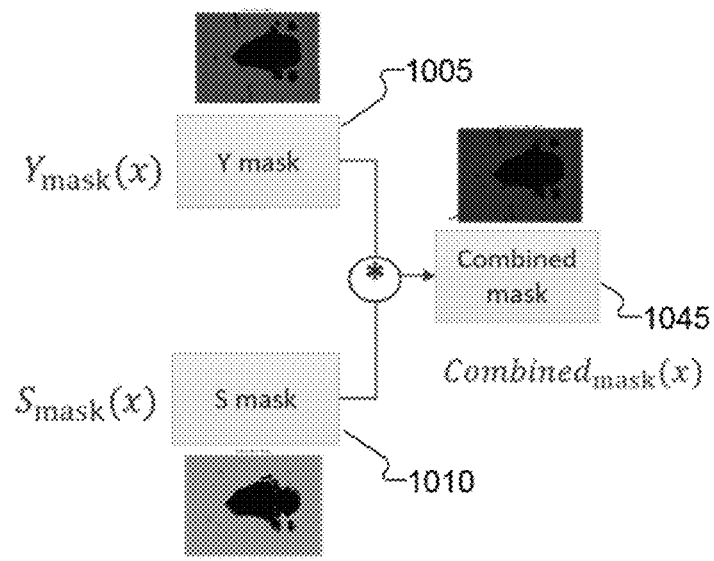
Figure 14:
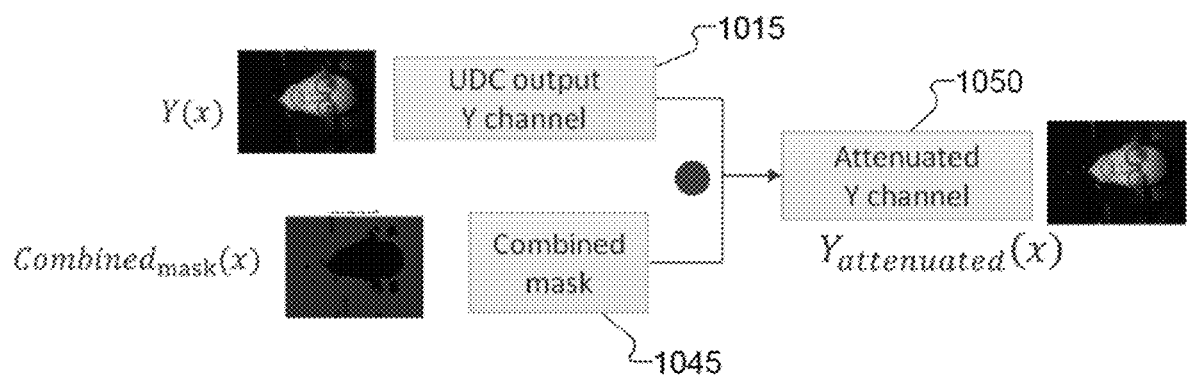
Figure 15:
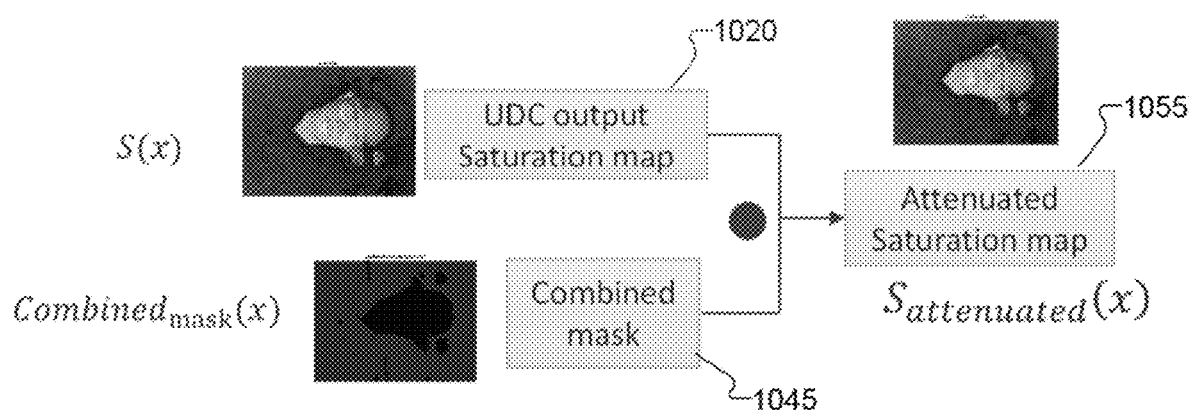

As shown in FIG. 12, the saturation map (from radially-adaptive gain function 1055) is denoted as S(x) 1205, where x indicates the pixel location. In certain embodiments, a gain function G (x) 1210 can have the same definition as G (x) 810 in the PSFI radial coring pipeline 705 of FIG. 8. Generally, G(x) 1210 can be any suitable gain function. A radial map radial_map(x) 1215 can be any function where the value is dependent on radius of the pixel. For radial attenuation in the corners, thr in G(x) 1210 can be set to be radially-adaptive, such as when thr=radial_map(x), where thr has increasing values towards the corners. Alternatively, g0 in G(x) 1210 can be set to be radially adaptive, such as when g0=radial_map(x), where g0 has decreasing values towards the corners. In some cases, the S mask 1010 can be determined as follows:

$$S_{mask}(x) = 1 - G(S(x)) \quad (5)$$

Given these expressions, the combined mask 1045 can be determined as follows:

$$Combined_{mask}(x) = Y_{mask}(x) * S_{mask}(x) \quad (6)$$

In Equation (6), $Y_{mask}(x)=1$ or $S_{mask}(x)=1$ means that the value of pixel x is below the threshold for Y or S and will be attenuated more. A zero value means that the value of pixel x is above the threshold for Y or S and will be applied a gain of one. The $Combined_{mask(x)}$ in the combined mask 1045 combines the gain information from both Y and S to produce an overall gain level for pixel x. A larger overall gain means the value of pixel x is below the threshold for both Y and S and will be attenuated more. A zero value means the value of pixel x is above the threshold for Y, S, or both Y and S and will be applied a gain of one.

In certain embodiments, $Y_{gainMap}(x)$ denotes the gain map to be applied on the Y channel and may be calculated based on $Combined_{mask}(x)$ as follows:

$$\text{When } Combined_{mask}(x)=0, \rightarrow \rightarrow Y_{gainMap}(x)=1 \quad (7)$$

$$\text{When } Combined_{mask}(x)=(1-g0\_Y)*(1-g0\_S), \rightarrow \rightarrow Y_{gainMap}(X)=g0\_Y \quad (8)$$

$$\text{When } Combined_{mask}(x) \in [0,(1-g0_Y)*(1-g0_S)], \rightarrow \rightarrow Y_{gainMap}(X) \text{ linearly interpolates between 1 and } g0_Y \quad (9)$$

In Equations (7)-(9), $g0_Y$ is the g0 for the Y channel, and $g0_S$ is the g0 for saturation map. From this, the following can be obtained:

$$Y_{attenuated}(x) = Y_{gainMap}(x) * Y(x) \quad (10)$$

Also, in certain embodiments, $S_{gainMap}(x)$ denotes the gain map to be applied on the saturation map and can be calculated based on $Combined_{mask}(x)$ as follows:

$$\text{When } Combined_{mask}(x)=0, \rightarrow \rightarrow S_{gainMap}(x)=1 \quad (11)$$

$$\text{When } Combined_{mask}(x)-(1-g0_Y)*(1-g0_S), \rightarrow \rightarrow S_{gainMap}(x) \quad (12)$$

When Combined$_{mask}(x) \in [0, (1-g0_T)*(1-g0_S)], \rightarrow \rightarrow S_{gainMap}(x)$ linearly interpolates between 1 and $g0_S$ (13)

From this, the following can be obtained:

$$S_{attenuated}(x) = S_{gainMap}(x) * S(x) \quad (14)$$

Again, the chroma suppression pipeline 1000 is configured to correct the bluish chroma coloring that occurs in corners of UDC images. The chroma suppression pipeline 1000 can be applied in the YUV domain or the RGB domain. The chroma suppression pipeline 1000 can also operate on images produced by an imaging system having a single camera or multiple cameras, such as an imaging system with an RGB camera and a monochrome camera.

Figures 16A, 16B:
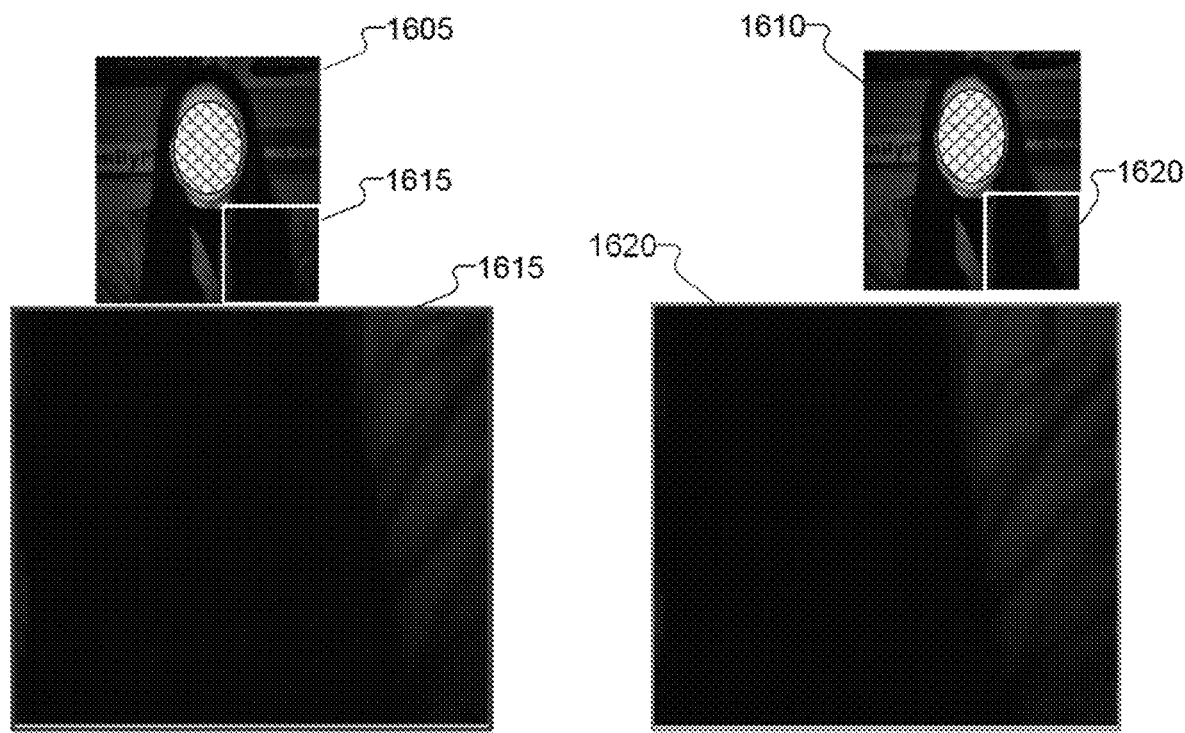
FIGS. 16A and 16B illustrate example results of a chroma suppression process in accordance with this disclosure.

FIGS. 16A and 16B illustrate example results of a chroma suppression process in accordance with this disclosure. The examples shown in FIGS. 16A and 16B are for illustration only. Other examples could be used without departing from the scope of the present disclosure. In the example shown in FIG. 16A, an image is captured, and a chroma suppression is not applied to the image to produce a first image 1605. A second image 1610 is produced with chroma suppression being applied. A corner 1615 from the first image 1605 includes blue artifacts, which are not in a corner 1620 from the second image 1610. That is, the bluish noise is suppressed in the corner 1620 in the second image 1610.

Figure 17:
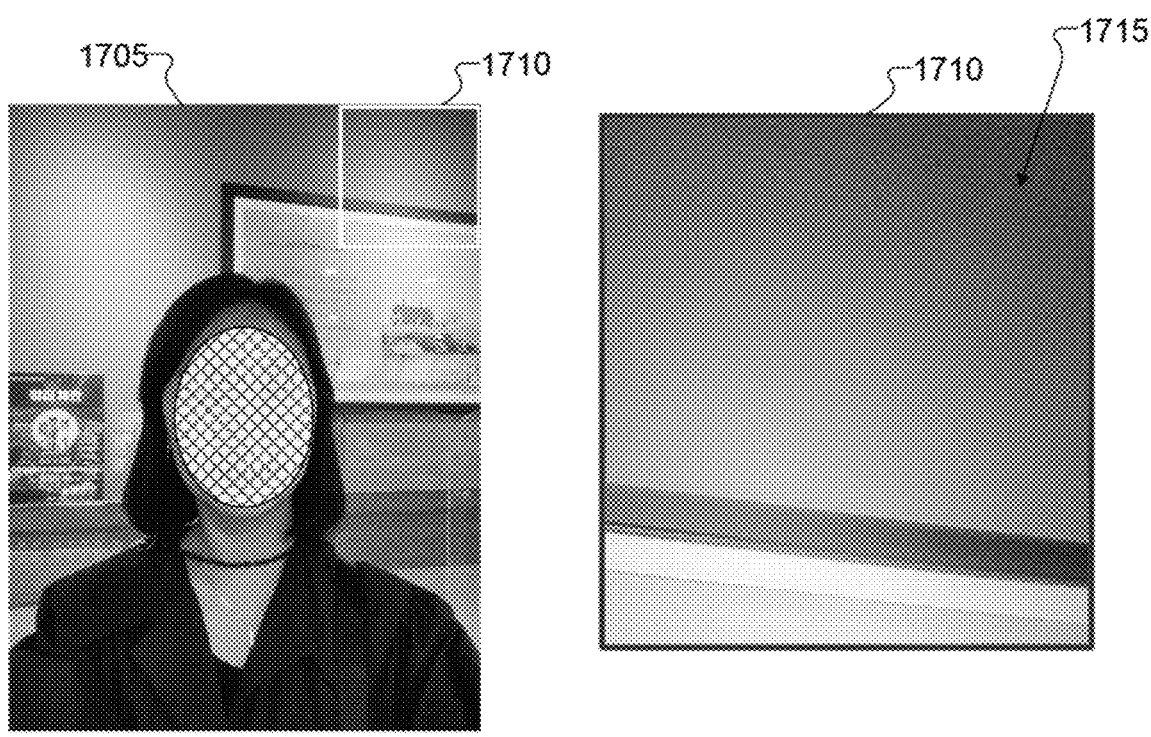
FIG. 17 illustrates an example of dither noise in accordance with this disclosure.

FIG. 17 illustrates an example of dither noise in accordance with this disclosure. The example shown in FIG. 17 is for illustration only. Other embodiments could be used without departing from the scope of the present disclosure. In certain embodiments, the image restoration 230 adds dither to the image. Dither is usually used to add back some of the noise removed in the denoising stage to the final output in order to give the image a more realistic look. In UDC images, the corners are usually noisier than the centers, so adding back noise with uniform strength all over the image would result in more noise in the corners. For example, as shown in the example illustrated in FIG. 17, a first image 1705 is captured by the UDC 205. As a result of adding back the dither, a corner 1710 includes more noise 1715 than the rest of the image. To address noise in the corners 1710 introduced by adding dither, certain embodiments of the present disclosure provide a radially-attenuated dither process for images captured using the UDC 205. That is, an image restoration includes a radially-attenuated dither pipeline that uses a radial map to attenuate the dither signal more towards the corners 1710.

Figure 18:
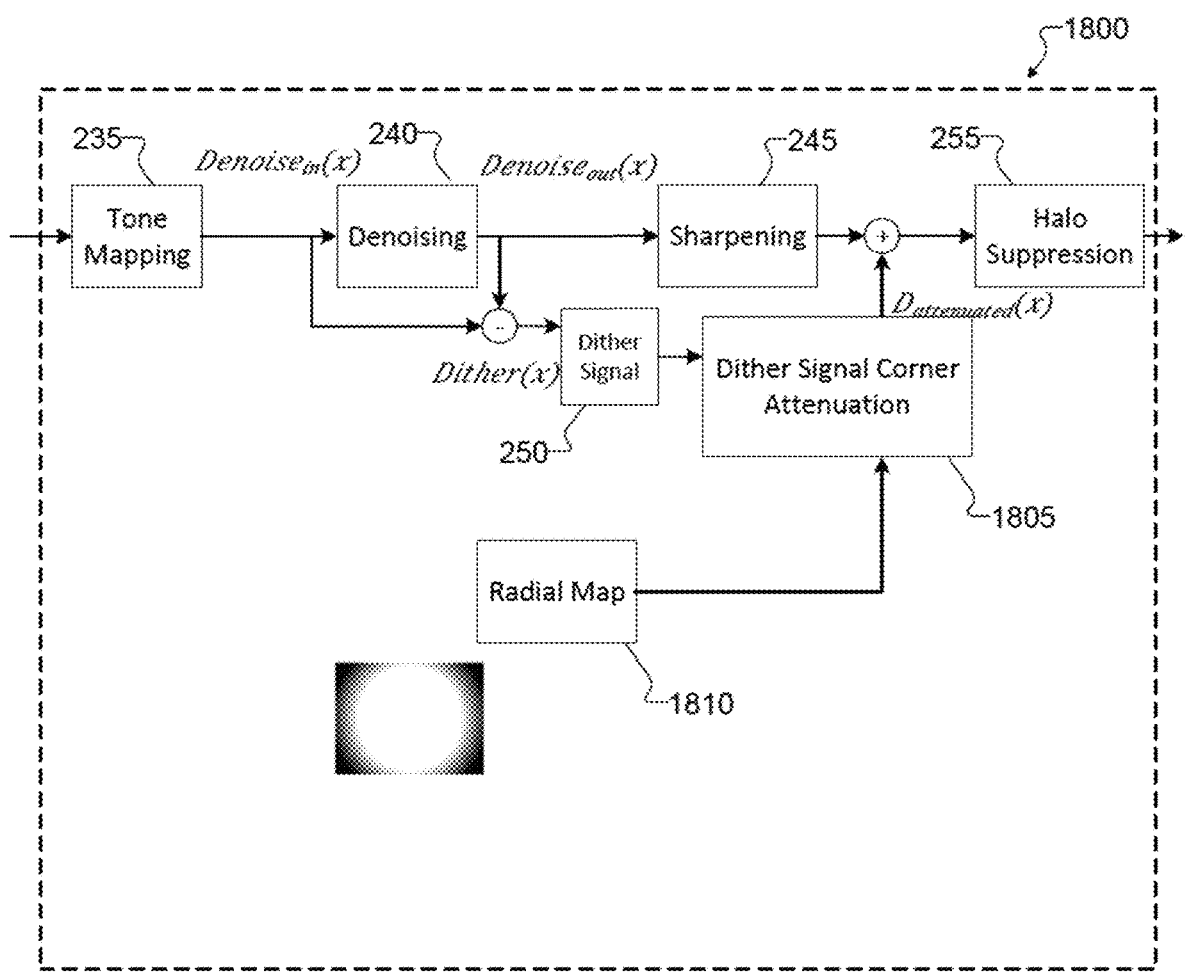
FIG. 18 illustrates an example image restoration pipeline with dither corner attenuation in accordance with this disclosure.

FIG. 18 illustrates an example image restoration pipeline 1800 with dither corner attenuation in accordance with this disclosure. The embodiment of the image restoration pipeline 1800 shown in FIG. 18 is for illustration only. Other embodiments could be used without departing from the scope of the present disclosure. The image restoration pipeline 1800 includes blocks or modules for tone mapping 235, denoising 240, sharpening 245, generation of a dither signal 250, and halo suppression 255. One or more of the blocks or modules can be implemented in hardware, software, firmware, or a combination of hardware and software/firmware. For example, one or more of the blocks can be implemented in processing circuitry configured to perform the specified functions or configured to execute instructions in an algorithm to perform the specified functions.

The image restoration pipeline 1800 receives an image, such as from the ISP 220 or combination of ISP 220 and PSFI radial coring pipeline 705. The image is processed through tone mapping 235 to produce a tone-mapped signal. The tone mapping 235 compresses the brightness and dynamic range of the image from a higher bit depth to a lower bit depth to compress the image brightness. The tone-mapped signal is provided to denoising 240 to remove noise from the tone-mapped signal and produce a denoised signal. For example, Denoise$_{in}(x)$ may represent the value of the input image prior to denoising at pixel x, and Denoise$_{out}(x)$ may represent the value of the output image after denoising at pixel x. Thereafter, the denoised signal is removed from the tone-mapped signal to produce the dither signal 250. For example, Dither(x) may represent the value of the dither signal 250 at pixel x and may be calculated as follows:

$$\text{Dither}(x) = \text{Denoise}_{out}(x) - \text{Denoise}_{in}(x) \quad (15)$$

The denoised signal is also processed through sharpening 245 to produce a sharpened signal. The dither signal 250 is processed through a dither signal corner attenuation 1805, which uses a radial map 1810 to attenuate the dither signal 250 more towards the corners of the image. The radial map 1810, radial_map(x), can be any function where the value is dependent on radius of the pixel x. Here, radial_map(x) has decreasing values towards the corners. The dither signal corner attenuation 1805 generates an attenuated dither signal, $D_{attenuated}(X)$, which may be determined as follows:

$$D_{attenuated}(x) = \text{radial\_map}(x) * \text{Dither}(x) \quad (16).$$

The output of the sharpening 245 is added to the attenuated dither signal. Adding the attenuated dither signal from the dither signal corner attenuation 1805 to the sharped signal reintroduces part of the noise that was removed by the denoising 240 and which is attenuated more towards the corners. Adding part of the noise reintroduces some lost details and assists in making the image more realistic, while weighting the noise adds less noise towards the corners (where more noise is already present). Thereafter, halo suppression 255 is applied to the resultant signal to produce a refined image.

Figure 19:
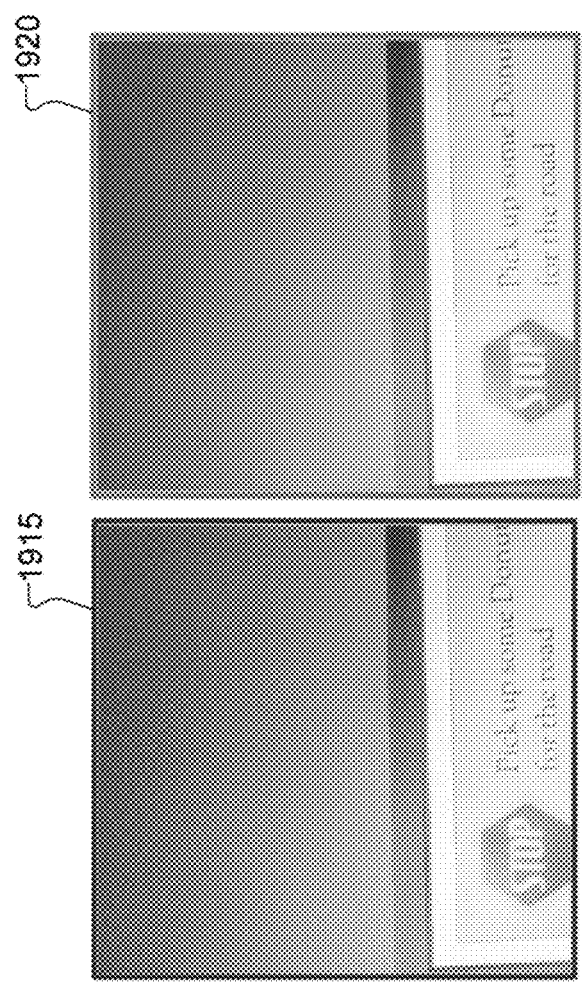
FIG. 19 illustrates example results from a dither corner attenuation process in accordance with this disclosure.
Figure 19:
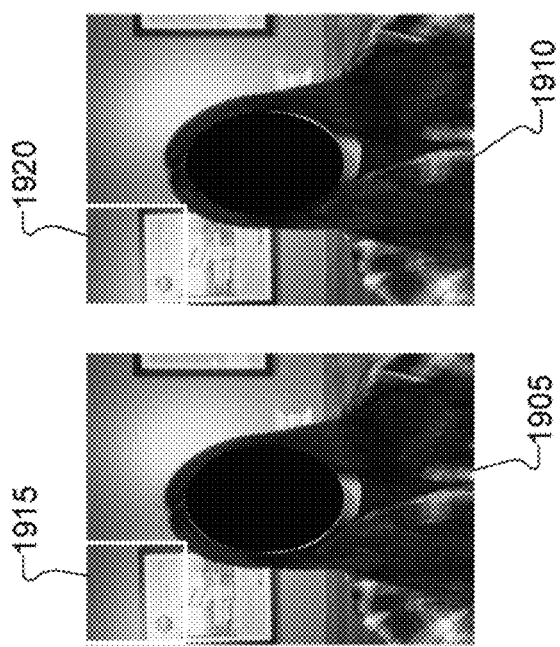

FIG. 19 illustrates example results from a dither corner attenuation process in accordance with this disclosure. The example shown in FIG. 19 is for illustration only. Other examples could be used without departing from the scope of the present disclosure. In the example shown in FIG. 19, an image is captured, and a dither corner attenuation process is not applied to the image to produce a first image 1905. A second image 1910 is produced with a dither corner attenuation process being applied. A corner 1915 from the first image 1905 includes noise, which is not present in a corner 1920 of the second image 1910. That is, the noise is suppressed in the corner 1920 in the second image 1910.

Figure 20:
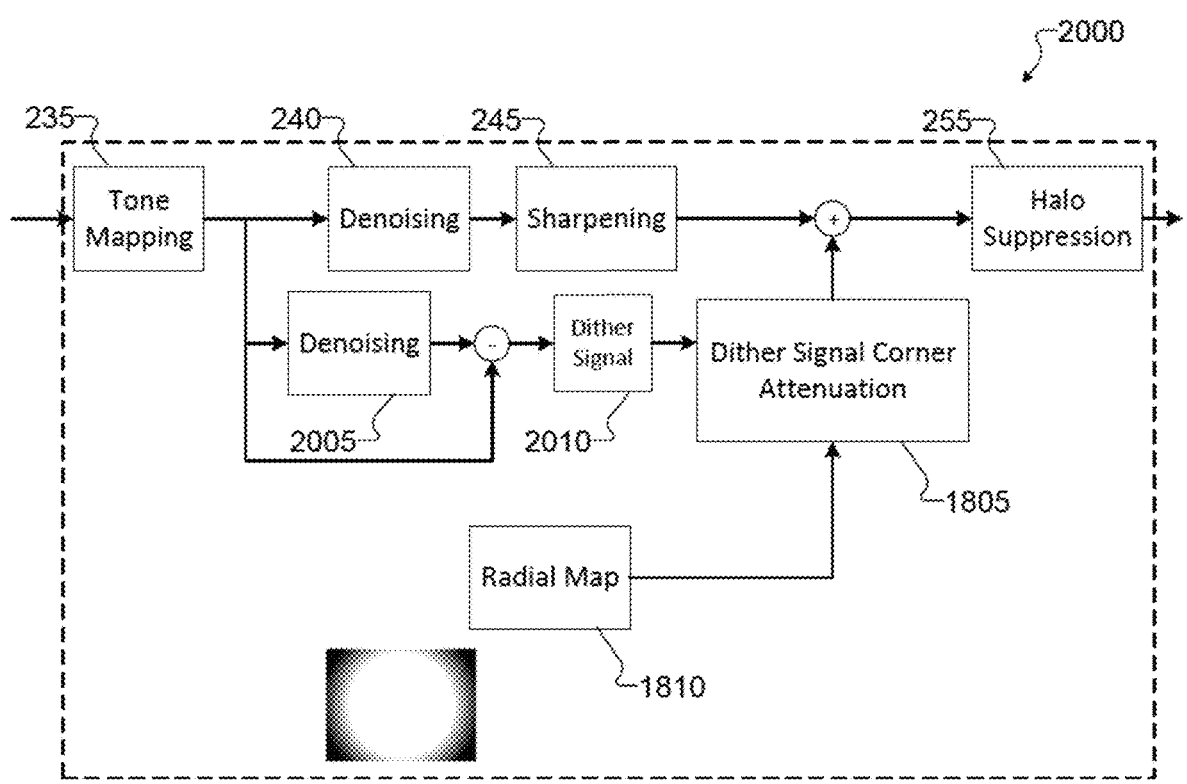
FIGS. 20 and 21 illustrate example dither corner attenuation pipelines in accordance with this disclosure.
Figure 21:
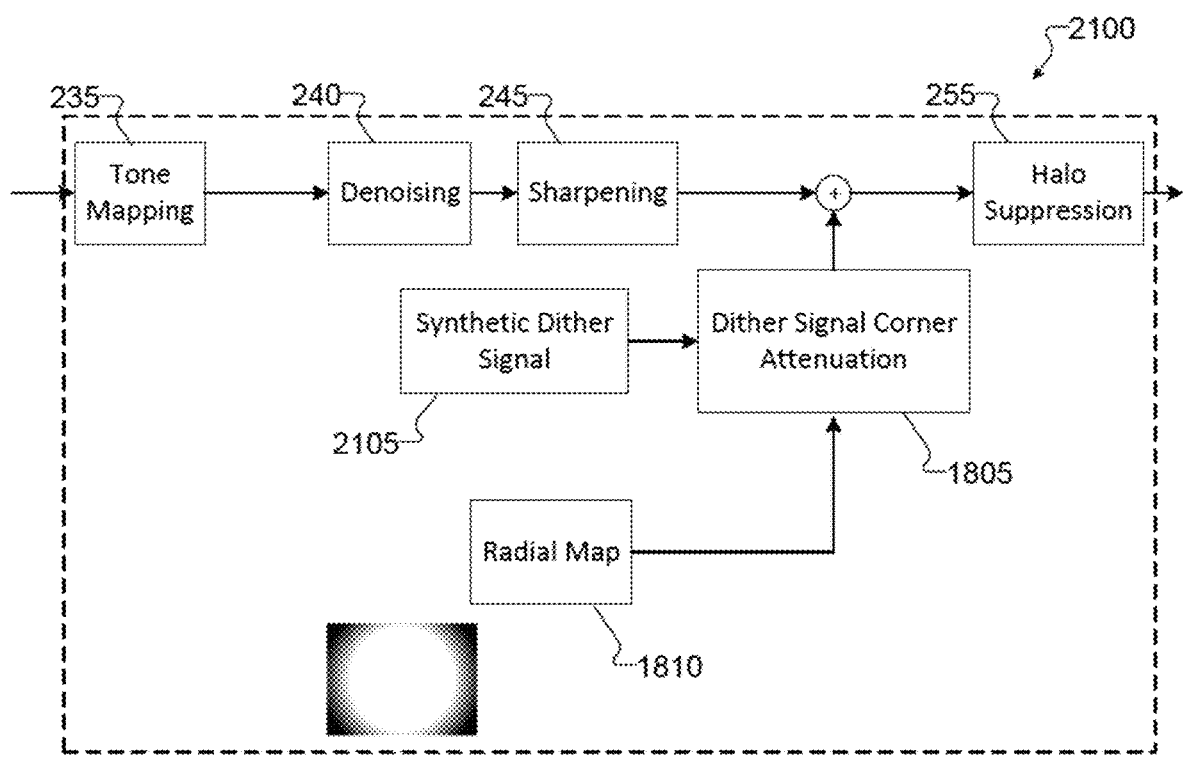

FIGS. 20 and 21 illustrate example dither corner attenuation pipelines 2000, 2100 in accordance with this disclosure. The embodiments of the dither corner attenuation pipelines 2000, 2100 shown in FIGS. 20 and 21 are for illustration only. Other embodiments could be used without departing from the scope of the present disclosure. In certain embodiments, the dither signal comes from another instance of a denoising block. In the example shown in FIG. 20, the image restoration 230 includes a dither corner attenuation pipeline 2000 having a second denoising block 2005. The second denoising block 2005 can perform a different denoising algorithm or apply a denoising strength that is different than the first denoising block (the denoising 240). In other embodiments, the dither signal can be synthesized noise generated using any suitable algorithm. In the example shown in FIG. 21, the image restoration 230 includes a dither corner attenuation pipeline 2100 having a synthetic dither signal 2105 that generates, via a synthesized denoising signal, a synthetic dither signal. The synthesized noise created by the synthetic dither signal 2105 is attenuated by the dither signal corner attenuation 1805 towards the corners using the radial map 1810.

Figure 22:
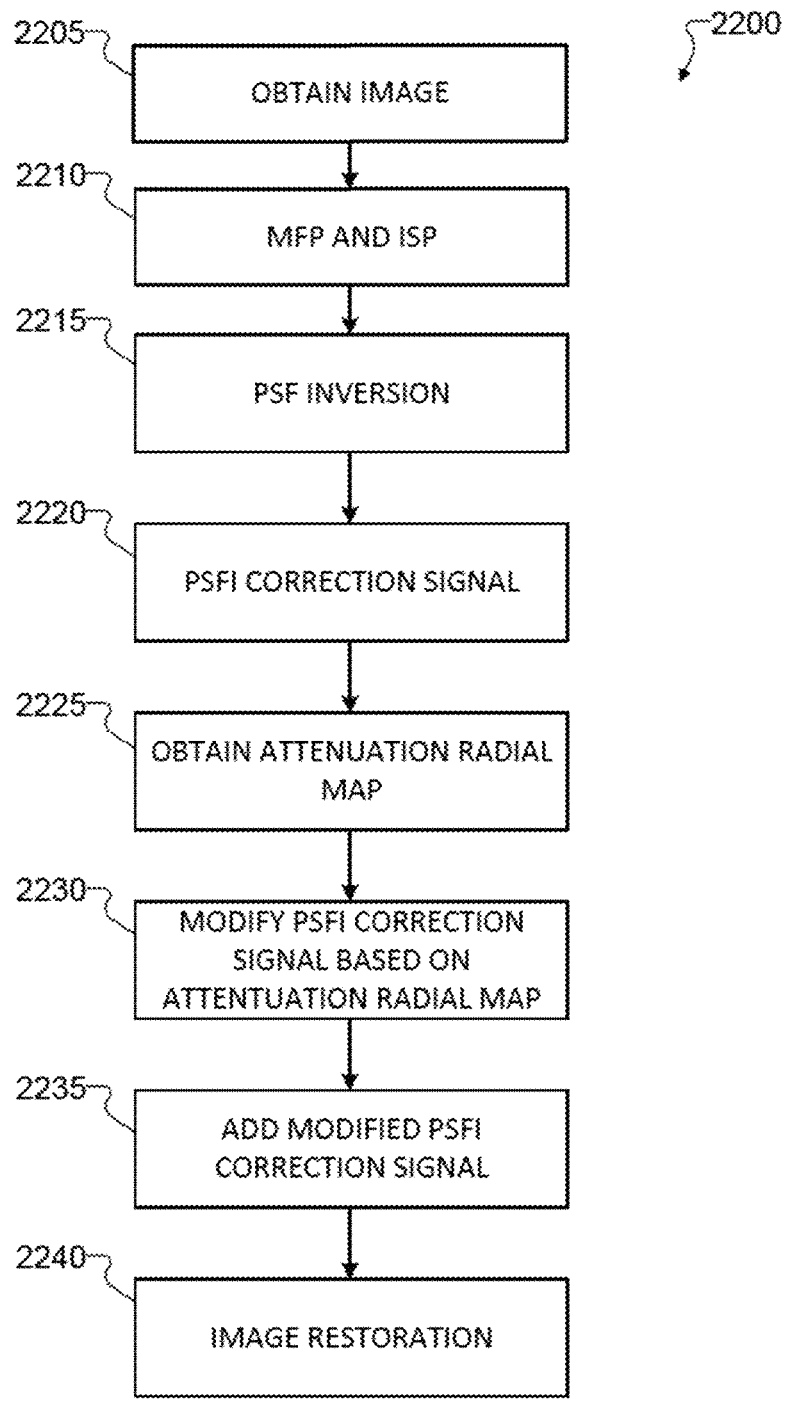
FIG. 22 illustrates an example process for a PSFI radial coring in accordance with this disclosure.

FIG. 22 illustrates an example process 2200 for a PSFI radial coring in accordance with this disclosure. While FIG. 22 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2200 depicted can be implemented by one or more processors in an image processing system, such as by one or more processors 120 of an electronic device 101. In some embodiments, one or more steps of the process 2200 are performed by one or more processors in an electronic device performing a machine learning (i.e., an artificial intelligence) process.

In operation 2205, one or more images are obtained. The images can be obtained via an imaging system that includes one or more cameras, a UDC, or a combination thereof. For example, the UDC 205 can capture multiple raw Bayer frames. In operation 2210, the one or more images are processed through the MFP and the ISP. The MFP applies a multi-frame processing algorithm, and the ISP converts the image, such as from the raw Bayer format to the RGB or YUV format. The ISP also performs a de-mosaic operation and outputs an RGB or YUV image. Since the display 160 is in front of the UDC 205, a point spread function causes a diffractive pattern, where the diffractive pattern causes the image quality to degrade. In operation 2215, a point spread function inversion is applied to the one or more images by the PSFI. In certain embodiments, the PSFI is applied to an output of the ISP. In certain embodiments, the PSFI is applied to an output of the MFP. The PSFI inverts the effects of the diffractive PSF to restore image quality.

A PSFI radial coring process is applied to the one or more images. The PSFI radial coring includes PSFI correction in operation 2220, generation of a radial attenuation map in operation 2225, modification of a PSFI correction signal in operation 2230, and addition of the modified PSFI correction signal in operation 2235. In operation 2220, the PSFI correction extracts signals before and after the PSFI to create a PSFI correction signal. In certain embodiments, the PSFI correction signal is based on outputs from the ISP and the PSFI. In certain embodiments, the PSFI correction signal is based on outputs from the MFP and the PSFI. The PSFI correction signal corresponds to the difference introduced by the PSFI. In operation 2225, an attenuation radial map is obtained. A radial map and a gain function may be used to generate the radial attenuation map, which determines the attenuation strength for each pixel in the image. The radial attenuation map attenuates more towards the image corners. In operation 2230, the PSFI correction signal is modified based on the radial attenuation map. The radial attenuation map can be element-wise multiplied with PSFI correction signal so that the corner areas are attenuated more strongly than the center, thereby suppressing corner noise enhancement. The PSFI correction signal can be modified to attenuate more towards the corners. In operation 2235, the modified PSFI correction signal is added. The attenuated PSFI correction signal is added back to the output of the ISP or the MFP.

In operation 2240, image restoration is performed. In the image restoration, the image is processed through tone mapping to produce a tone-mapped signal. The tone mapping compresses the brightness and dynamic range of the image from a higher bit depth to a lower bit depth to compress the image brightness. The tone-mapped signal can be provided to denoising to remove noise from the tone-mapped signal and produce a denoised signal. The denoised signal can be removed from the tone-mapped signal to produce a dither signal. The denoised signal can also be processed through sharpening to produce a sharpened signal, which can be added to the dither signal. Adding the dither signal to the sharped signal reintroduces part of the noise that was removed by the denoising. Adding part of the noise reintroduces some lost details and assists in making the image more realistic. Thereafter, halo suppression is applied to the resultant signal to produce a refined image.

Figure 23:
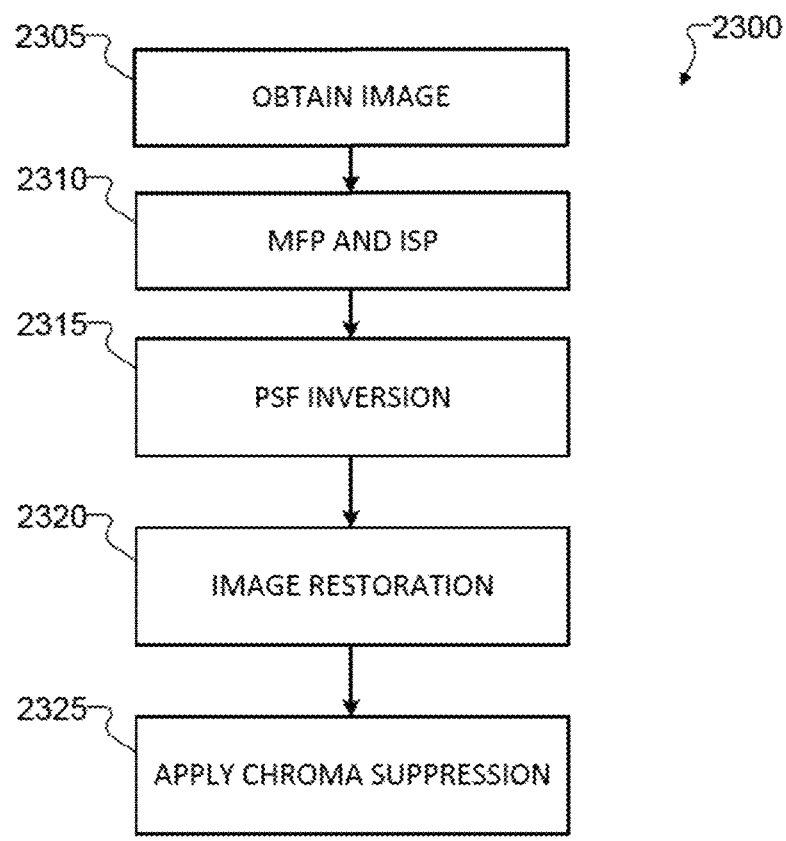
FIG. 23 illustrates an example process for chroma suppression in accordance with this disclosure.

FIG. 23 illustrates an example process 2300 for chroma suppression in accordance with this disclosure. While FIG. 23 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2300 depicted can be implemented by one or more processors in an image processing system, such as by one or more processors 120 of an electronic device 101. In some embodiments, one or more steps of the process 2300 are performed by one or more processors in an electronic device performing a machine learning (i.e., an artificial intelligence) process.

In operation 2305, one or more images are obtained. The images can be obtained via an imaging system that includes one or more cameras, a UDC, or a combination thereof. For example, the UDC 205 can capture multiple raw Bayer frames. In operation 2310, the one or more images are processed through the MFP and the ISP. The MFP applies a multi-frame processing algorithm, and the ISP converts the image, such as from the raw Bayer format to the RGB or YUV format. The ISP also performs a de-mosaic operation and outputs an RGB or YUV image. Since the display 160 is in front of the UDC 205, a point spread function causes a diffractive pattern, where the diffractive pattern causes the image quality to degrade. In operation 2315, a point spread function inversion is applied to the one or more images by the PSFI. In certain embodiments, the PSFI is applied to an output of the ISP. In certain embodiments, the PSFI is applied to an output of the MFP. The PSFI inverts the effects of the diffractive PSF to restore image quality.

In operation 2320, image restoration is performed. In the image restoration, the image is processed through tone mapping to produce a tone-mapped signal. The tone mapping compresses the brightness and dynamic range of the image from a higher bit depth to a lower bit depth to compress the image brightness. The tone-mapped signal can be provided to denoising to remove noise from the tone-mapped signal and produce a denoised signal. The denoised signal can be removed from the tone-mapped signal to produce a dither signal. The denoised signal can also be processed through sharpening to produce a sharpened signal, which can be added to the dither signal. Adding the dither signal to the sharped signal reintroduces part of the noise that was removed by the denoising. Adding part of the noise reintroduces some lost details and assists in making the image more realistic. Thereafter, halo suppression is applied to the resultant signal to produce a refined image.

In operation 2325, chroma suppression is applied to the restored image. The chroma suppression process reduces bluish noise artifacts in the UDC images' corners based on image characteristics. For example, a radially-adaptive Y mask can be used to select dark areas in the corners, and an S mask can be generated to select the blue area in the corners. Y values and saturation values are reduced for pixels that are selected by both the Y and saturation masks. Based on UDC image characteristics, the chroma suppression process reduces the brightness and color saturation in dark and blue areas in the corners of the image. The chroma suppression process may obtain, from the image, an output Y channel and an output saturation map. The output Y channel can be combined with a radially-adaptive gain function and a radial map to form a Y channel mask. The output saturation map can be combined with a radially-adaptive gain function and a radial map to form an S mask. The Y mask and S mask can be combined to form a combined mask. The combined mask can be combined with the output Y channel to create an attenuated Y channel and combined with the output saturation map to create an attenuated S map. The attenuated Y channel can be combined with the attenuated S map to form a chroma-suppressed output image.

Figure 24:
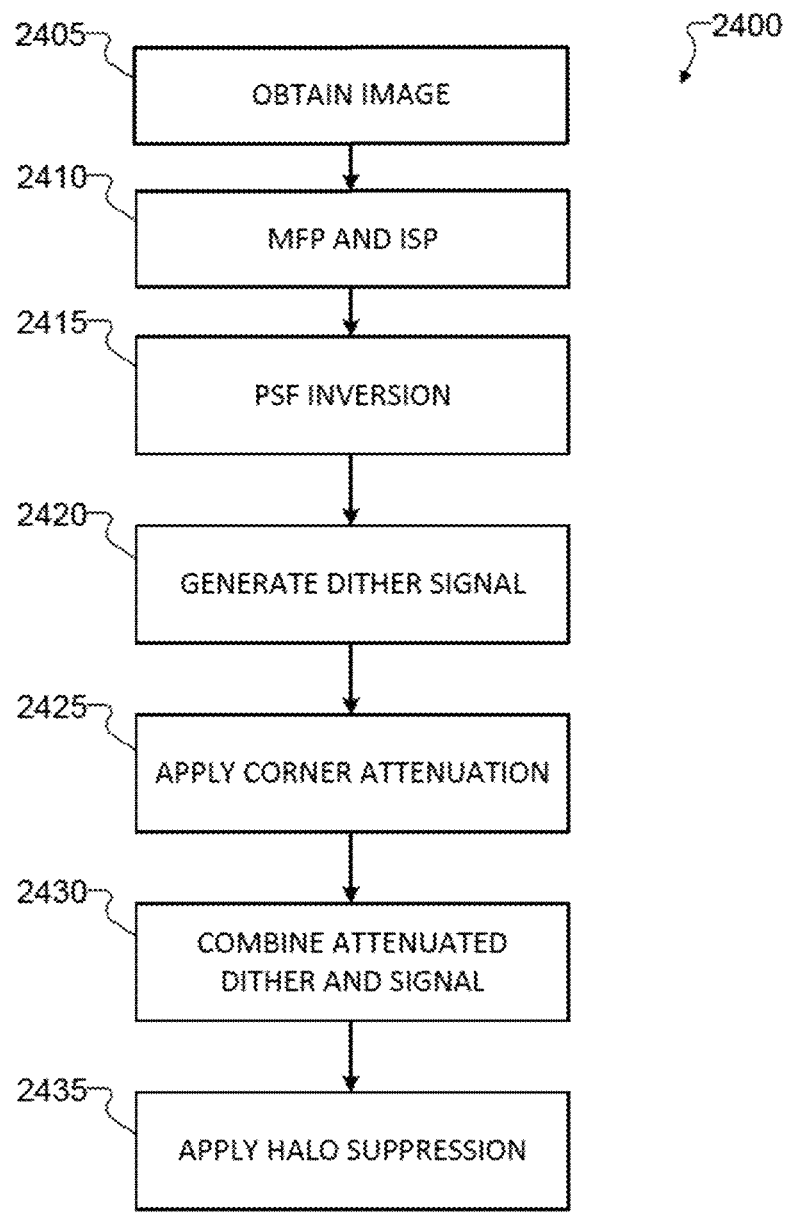
FIG. 24 illustrates an example process for dither corner attenuation in accordance with this disclosure.

FIG. 24 illustrates an example process for dither corner attenuation in accordance with this disclosure. While FIG. 24 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2400 depicted can be implemented by one or more processors in an image processing system, such as by one or more processors 120 of an electronic device 101. In some embodiments, one or more steps of the process 2400 are performed by one or more processors in an electronic device performing a machine learning (i.e., an artificial intelligence) process.

In operation 2405, one or more images are obtained. The images can be obtained via an imaging system that includes one or more cameras, a UDC, or a combination thereof. For example, the UDC 205 can capture multiple raw Bayer frames. In operation 2410, the one or more images are processed through the MFP and the ISP. The MFP applies a multi-frame processing algorithm, and the ISP converts the image, such as from the raw Bayer format to the RGB or YUV format. The ISP also performs a de-mosaic operation and outputs an RGB or YUV image. Since the display 160 is in front of the UDC 205, a point spread function causes a diffractive pattern, where the diffractive pattern causes the image quality to degrade. In operation 2415, a point spread function inversion is applied to the one or more images by the PSFI. In certain embodiments, the PSFI is applied to an output of the ISP. In certain embodiments, the PSFI is applied to an output of the MFP. The PSFI inverts the effects of the diffractive PSF to restore image quality.

An image restoration process is applied to the one or more images. The image restoration includes dither signal generation in operation 2420, corner attenuation in operation 2425, combination of an attenuated dither signal and a sharpened signal in operation 2430, and application of a halo suppression in operation 2435. In operation 2420, a dither signal is generated. In certain embodiments, a denoised signal is removed from the tone-mapped signal to produce a dither signal. In certain embodiments, the denoised signal is produced via a different or second denoising block different from the denoising 240. In certain embodiments, the dither signal is synthetically generated. In operation 2425, the dither signal is processed through the dither signal corner attenuation 1805, which uses a radial map 1810 to attenuate the dither signal more towards the corners. In operation 2430, the sharpened signal and the attenuated dither signal are combined. Adding the attenuated dither signal to the sharped signal reintroduces part of the noise that was removed by the denoising and which is attenuated more towards the corners. Adding part of the noise reintroduces some lost details and assists in making the image more realistic, while weighting the noise adds less noise towards the corners (where more noise is already present). In operation 2435, halo suppression is applied to the resultant signal to produce a refined image.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
a display;
an imaging system; and
at least one processor configured to:
obtain an image captured by the imaging system, the image comprising one or more frames;
perform multi-frame processing and image signal processing on the image to produce a first processed image;
perform a point spread function inversion (PSFI) on the first processed image to produce a second processed image; and
apply PSFI radial coring on the second processed image, wherein the PSFI radial coring is configured to reduce noise in the second processed image resulting from the PSFI.

2. The electronic device of claim 1, wherein, to apply the PSFI radial coring, the at least one processor is configured to:
apply a PSFI correction signal by subtracting the first processed image from the second processed image;
obtain an attenuation radial map from a radial map and a radially-adaptive gain curve;
modify the PSFI correction signal by element-wise multiplication with the attenuation radial map; and
add the modified PSFI correction signal back to the first processed image to produce a third processed image.

3. The electronic device of claim 2, wherein the attenuation radial map is configured to apply a gain parameter to attenuate the PSFI correction signal on a pixel basis.

4. The electronic device of claim 3, wherein the gain parameter is based on a radial adaptive gain function configured to apply a gain value as a function of a threshold value and slope.

5. The electronic device of claim 2, wherein the attenuation radial map is configured to attenuate the PSFI correction signal more towards corners of the second processed image.

6. The electronic device of claim 1, wherein the at least one processor is configured to apply the PSFI radial coring in one of: a YUV domain or an RGB domain.

7. The electronic device of claim 1, wherein the imaging system comprises one of:
a single camera;
a multiple camera system; or
an under display camera (UDC).

8. A method comprising:
obtaining an image, the image comprising one or more frames;
performing multi-frame processing and image signal processing on the image to produce a first processed image;
performing a point spread function inversion (PSFI) on the first processed image to produce a second processed image; and
applying PSFI radial coring on the second processed image, wherein the PSFI radial coring is configured to reduce noise in the second processed image resulting from the PSFI.

9. The method of claim 8, wherein applying the PSFI radial coring comprises:
applying a PSFI correction signal by subtracting the first processed image from the second processed image;
obtaining an attenuation radial map from a radial map and a radially-adaptive gain curve;
modifying the PSFI correction signal by element-wise multiplication with the attenuation radial map; and
adding the modified PSFI correction signal back to the first processed image to produce a third processed image.

10. The method of claim 9, wherein the attenuation radial map is configured to apply a gain parameter to attenuate the PSFI correction signal on a pixel basis.

11. The method of claim 10, wherein the gain parameter is generated by a radial adaptive gain function configured to apply a gain value as a function of a threshold value and slope.

12. The method of claim 9, wherein the attenuation radial map is configured to attenuate the PSFI correction signal more towards corners of the second processed image.

13. The method of claim 9, further comprising:
performing image restoration on the third processed image to produce an output image.

14. The method of claim 8, wherein applying the PSFI radial coring comprises applying the PSFI coring in one of: a YUV domain or an RGB domain.

15. A non-transitory computer readable medium containing instructions that when executed cause at least one processor to:
obtain an image, the image comprising one or more frames;
perform multi-frame processing and image signal processing on the image to produce a first processed image;
perform a point spread function inversion (PSFI) on the first processed image to produce a second processed image; and
apply PSFI radial coring on the second processed image, wherein the PSFI radial coring is configured to reduce noise in the second processed image resulting from the PSFI.

16. The non-transitory computer readable medium of claim 15, wherein the instructions that when executed cause the at least one processor to apply the PSFI radial coring comprise instructions that when executed cause the at least one processor to:
apply a PSFI correction signal by subtracting the first processed image from the second processed image;
obtain an attenuation radial map from a radial map and a radially-adaptive gain curve;
modify the PSFI correction signal by element-wise multiplication with the attenuation radial map; and
add the modified PSFI correction signal back to the first processed image to produce a third processed image.

17. The non-transitory computer readable medium of claim 16, wherein the attenuation radial map is configured to apply a gain parameter to attenuate the PSFI correction signal on a pixel basis.

18. The non-transitory computer readable medium of claim 17, wherein the gain parameter is based on a radial adaptive gain function configured to apply a gain value as a function of a threshold value and slope.

19. The non-transitory computer readable medium of claim 16, wherein the attenuation radial map is configured to attenuate the PSFI correction signal more towards corners of the second processed image.

20. The non-transitory computer readable medium of claim 15, wherein the instructions when executed cause the at least one processor to apply the PSFI radial coring in one of: a YUV domain or an RGB domain.

* * * * *